US012690029B2

(12) United States Patent
Wong et al.

(10) Patent No.: US 12,690,029 B2
(45) Date of Patent: Jul. 21, 2026

(54) METHODS AND COMMUNICATIONS DEVICES

(71) Applicant: Sony Group Corporation, Tokyo (JP)

(72) Inventors: Shin Horng Wong, Basingstoke (GB); Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 740 days.

(21) Appl. No.: 18/018,888

(22) PCT Filed: Aug. 3, 2021

(86) PCT No.: PCT/EP2021/071648
§ 371 (c)(1),
(2) Date: Jan. 31, 2023

(87) PCT Pub. No.: WO2022/029112
PCT Pub. Date: Feb. 10, 2022

(65) Prior Publication Data
US 2024/0089954 A1        Mar. 14, 2024

(30) Foreign Application Priority Data

Aug. 7, 2020    (EP) ..................................... 20190152

(51) Int. Cl.
*H04W 72/1268*          (2023.01)
*H04L 1/1812*          (2023.01)
(Continued)

(52) U.S. Cl.
CPC ....... *H04W 72/1268* (2013.01); *H04L 1/1812* (2013.01); *H04W 72/21* (2023.01); *H04W 74/0816* (2013.01)

(58) Field of Classification Search
None
See application file for complete search history.

(56) References Cited

U.S. PATENT DOCUMENTS

2019/0313419 A1    10/2019    Fakoorian et al.
2019/0342911 A1    11/2019    Talarico et al.
(Continued)

FOREIGN PATENT DOCUMENTS

WO          2020/033395 A1      2/2020

OTHER PUBLICATIONS

International Search Report and Written Opinion mailed on Dec. 3, 2021, received for PCT Application PCT/EP2021/071648, filed on Aug. 3, 2021, 11 pages.
(Continued)

*Primary Examiner* — Jenkey Van
(74) *Attorney, Agent, or Firm* — XSENSUS LLP

(57) ABSTRACT

Method of operating a communications device receiving from a wireless access network a configured grant of physical uplink shared channel, CG-PUSCH, resources of a wireless access interface which includes physical resources of an unlicensed frequency bandwidth. The CG-PUSCH resources provide flexible transmission occasions to transmit uplink transport blocks as a plurality of K repetitions. Each repetition is one of a plurality of redundancy versions, the opportunities of the CG-PUSCH are accessible for transmission according to a contention access procedure. The procedure is performed to transmit the uplink transport blocks as a plurality of K repetitions in the transmission occasions. For each uplink transport block, uplink control information, UCI, is transmitted. The UCI relates to the CG. The CG-UCI provides an indication for the transmitted K plurality of repetitions and is multiplexed into a subset of the transmitted K plurality of repetitions.

18 Claims, 15 Drawing Sheets

(51) Int. Cl.
  *H04W 72/21* (2023.01)
  *H04W 74/0816* (2024.01)

(56) References Cited

U.S. PATENT DOCUMENTS

| | | | | |
|---|---|---|---|---|
| 2021/0144743 | A1* | 5/2021 | Rastegardoost | H04W 72/23 |
| 2022/0046696 | A1* | 2/2022 | Park | H04L 27/2607 |
| 2022/0174699 | A1* | 6/2022 | El Hamss | H04W 72/21 |
| 2022/0174722 | A1* | 6/2022 | Talarico | H04W 74/002 |
| 2023/0217447 | A1* | 7/2023 | Guo | H04W 72/21 |
| | | | | 370/329 |
| 2023/0319819 | A1* | 10/2023 | Wang | H04L 5/0048 |
| | | | | 370/336 |

OTHER PUBLICATIONS

CATT, "Corrections to DL/UL scheduling and HARQ management", 3GPP TSG RAN WG1 Meeting #94, R1-1808380, Aug. 20-24, 2018, 16 pages.

Holma et al., "LTE for UMTS OFDMA and SC-FDMA Based Radio Access", John Wiley & Sons, 2009, 232 pages.
3GPP, "Study on Scenarios and Requirements for Next Generation Access Technologies; (Release 14)", 3GPP TR 38.913 V14.3.0, Jun. 2017, pp. 1-39.
Huawei et al., "Physical layer enhancements for NR ultra-reliable and low latency communication (URLLC)", 3GPP TSG RAN Meeting #83, RP-190726, Mar. 18-21, 2019, 5 pages.
Nokia et al., "Revised WID: Enhanced Industrial Internet of Things (IoT) and ultra-reliable and low latency communication (URLLC) support for NR", 3GPP TSG RAN Meeting #88e, RP-201310, Jun. 29-Jul. 3, 2020, 6 pages.
Qualcomm Inc., "NR-based Access to Unlicensed Spectrum", 3GPP TSG RAN Meeting #84, RP-191575, Jun. 3-6, 2019, 8 pages.
3GPP, "NR; Medium Access Control (MAC) protocol specification (Release 16)", 3GPP TS 38.321 V16.1.0, Jul. 2020, pp. 1-151.
3GPP, "NR; Multiplexing and channel coding (Release 16)", 3GPP TS 38.212 V16.1.0, Mar. 2020, pp. 1-146.

* cited by examiner

Transmission Occasion     PUSCH

METHODS AND COMMUNICATIONS DEVICES

CROSS-REFERENCE TO RELATED APPLICATIONS

This application is based on PCT filing PCT/EP2021/071648, filed on Aug. 3, 2021, which claims the Paris Convention priority to European Patent Application No. EP20190152.7, filed on Aug. 7, 2020, the contents of each are incorporated herein by reference in their entirety.

BACKGROUND

Field of Disclosure

The present disclosure relates to communications devices, infrastructure equipment and methods for the transmission of data by a communications device in a wireless communications network.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to routinely and efficiently support communications with an ever increasing range of devices associated with a wider range of data traffic profiles and types than existing systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) systems/ new radio access technology (RAT) systems, as well as future iterations/releases of existing systems, to efficiently support connectivity for a wide range of devices associated with different applications and different characteristic data traffic profiles and requirements.

One example of a new service is referred to as Ultra Reliable Low Latency Communications (URLLC) services which, as its name suggests, requires that a data unit or packet be communicated with a high reliability and with a low communications delay. Another example of a new service is Enhanced Mobile Broadband (eMBB) services, which are characterised by a high capacity with a requirement to support up to 20 Gb/s. URLLC and eMBB type services therefore represent challenging examples for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device in a wireless communications network. The method comprises receiving from the wireless access network a configured grant, CG, of physical uplink shared channel, PUSCH, resources of a wireless access interface, the physical resources being included as part of an unlicensed frequency bandwidth. The unlicensed frequency bandwidth may be used by other communications systems, so the communications device may not be able to use the CG-PUSCH at a time when it schedules transmissions. The configured CG-PUSCH resources therefore provide a plurality of flexible transmission occasions for the communications device to transmit uplink transport blocks, the transmission opportunities of the CG-PUSCH being "flexible" because they may not be available to the communications device when it schedules a transmission in the transmission occasion. The flexible transmission occasions are accessible for transmission according to a contentious access procedure of the wireless access interface in the unlicensed frequency bandwidth. The uplink transport blocks are schedule for transmission as a plurality of K repetitions of each of the uplink transport blocks, each repetition being one of a plurality of redundancy versions, each repetition being scheduled for transmission in one of the flexible transmission occasions of the CG-UCI. The method comprises performing the contentious access procedure to transmit the uplink transport blocks as one or more of the plurality of the K repetitions in the flexible transmission occasions according to the contentious access procedure. The number of the one or more of the K repetitions actually transmitted may be less than the number K of the plurality of transmission scheduled, because one or more of the flexible transmission occasions for which the K repetitions have been scheduled may not be available because the contentious access procedure fails or may be otherwise interrupted. The method further comprises transmitting for each uplink transport block, transmitted as the one or more of the K repetitions, uplink control information, UCI, relating to the configured grant, CG (CG-UCI). In one example, the CG-UCI provides an indication for the one or more K plurality of repetitions. According to example embodiments the transmitting the CG-UCI comprises multiplexing the CG-UCI into a subset of the transmitted one or more K plurality of repetitions.

By multiplexing the CG-UCI into a subset of the transmitted one or more of the K repetitions, control information for signalling which out of the one or more K repetitions were actually transmitted so that these can be decoded by a receiver in the wireless communications network.

Embodiments of the present technique, which, in addition to methods of operating communications devices, relate to methods of operating infrastructure equipment, communications devices and infrastructure equipment, and circuitry for communications devices and infrastructure equipment, allow for more efficient use of radio resources by a communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
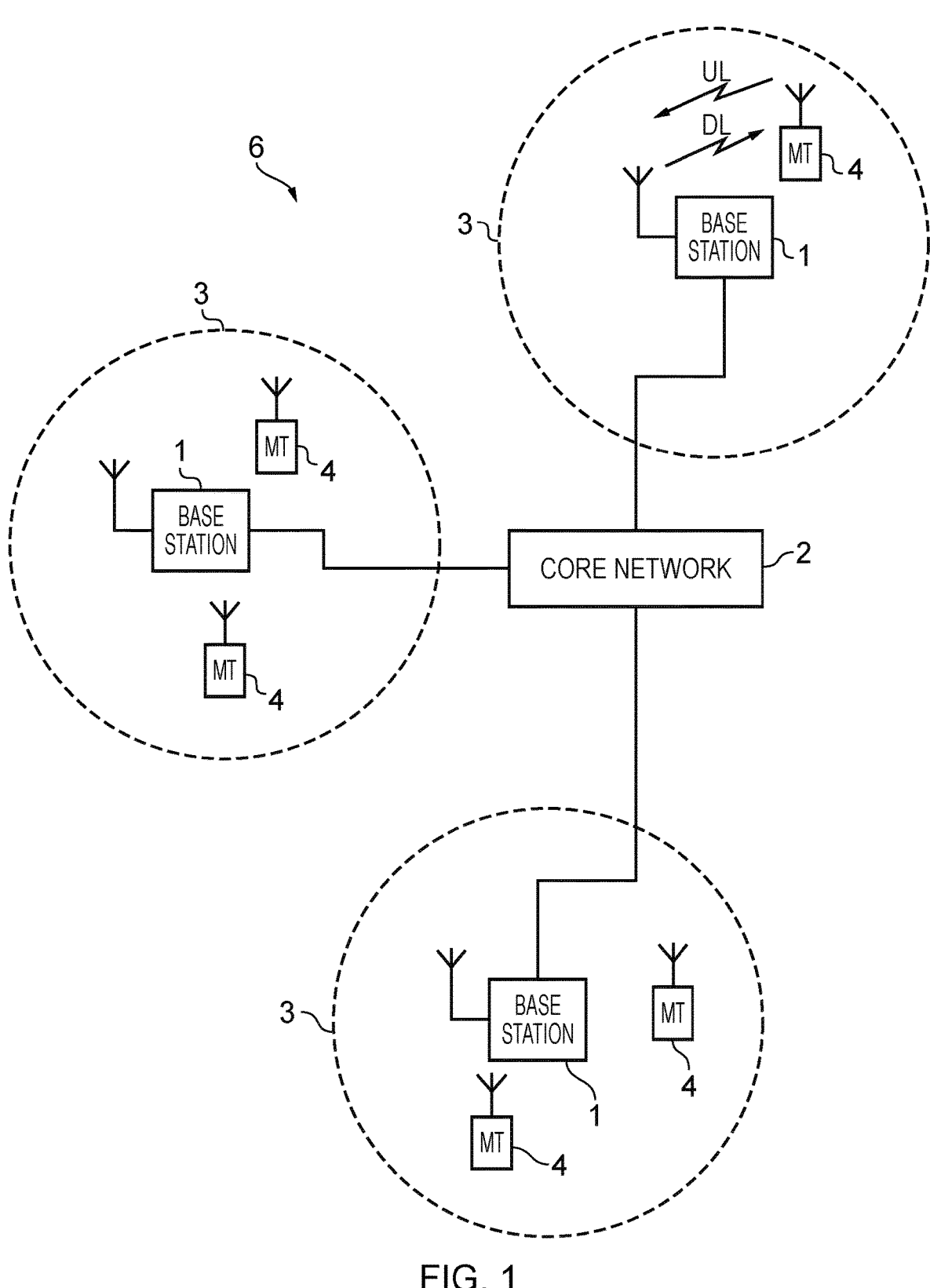
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
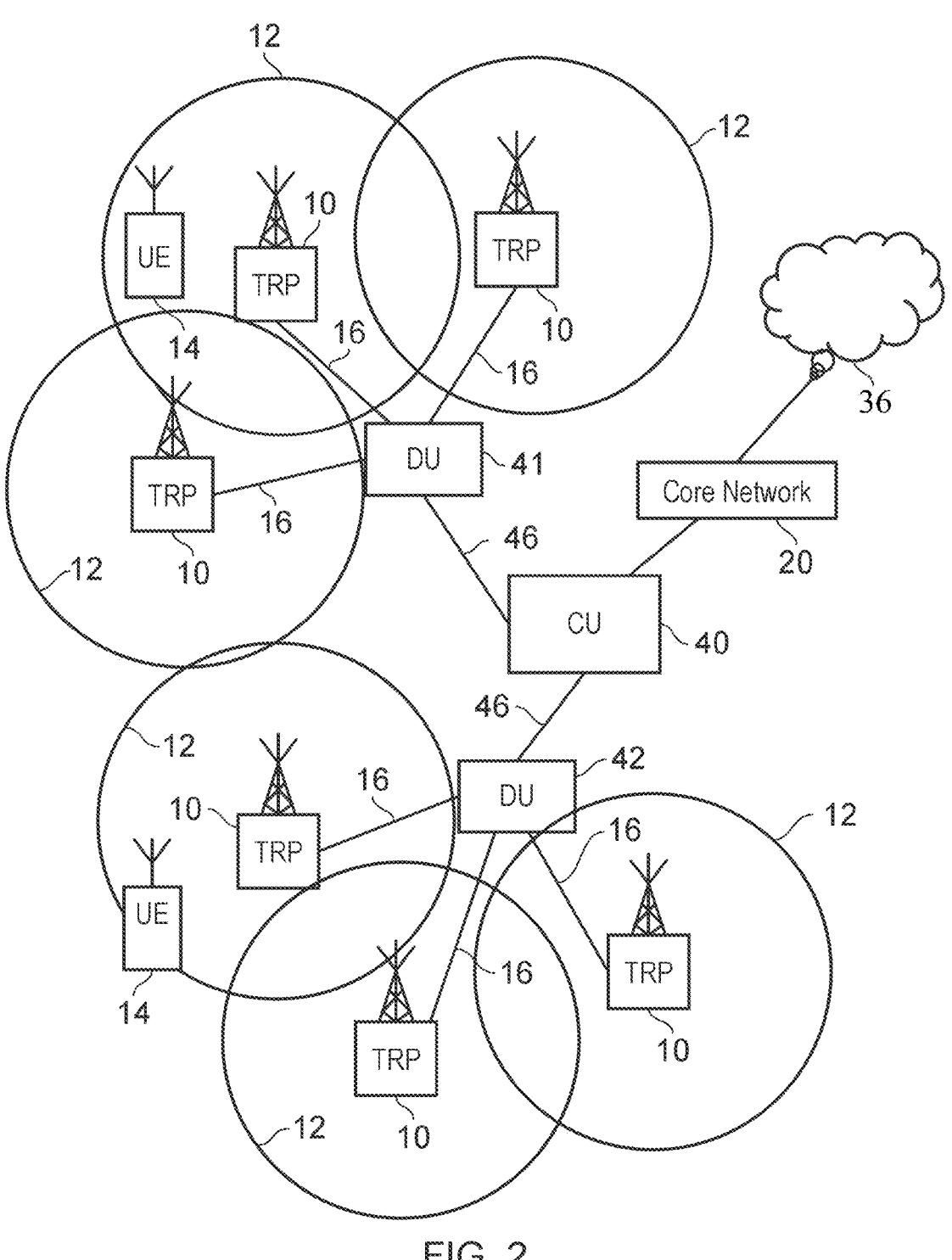
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 36.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
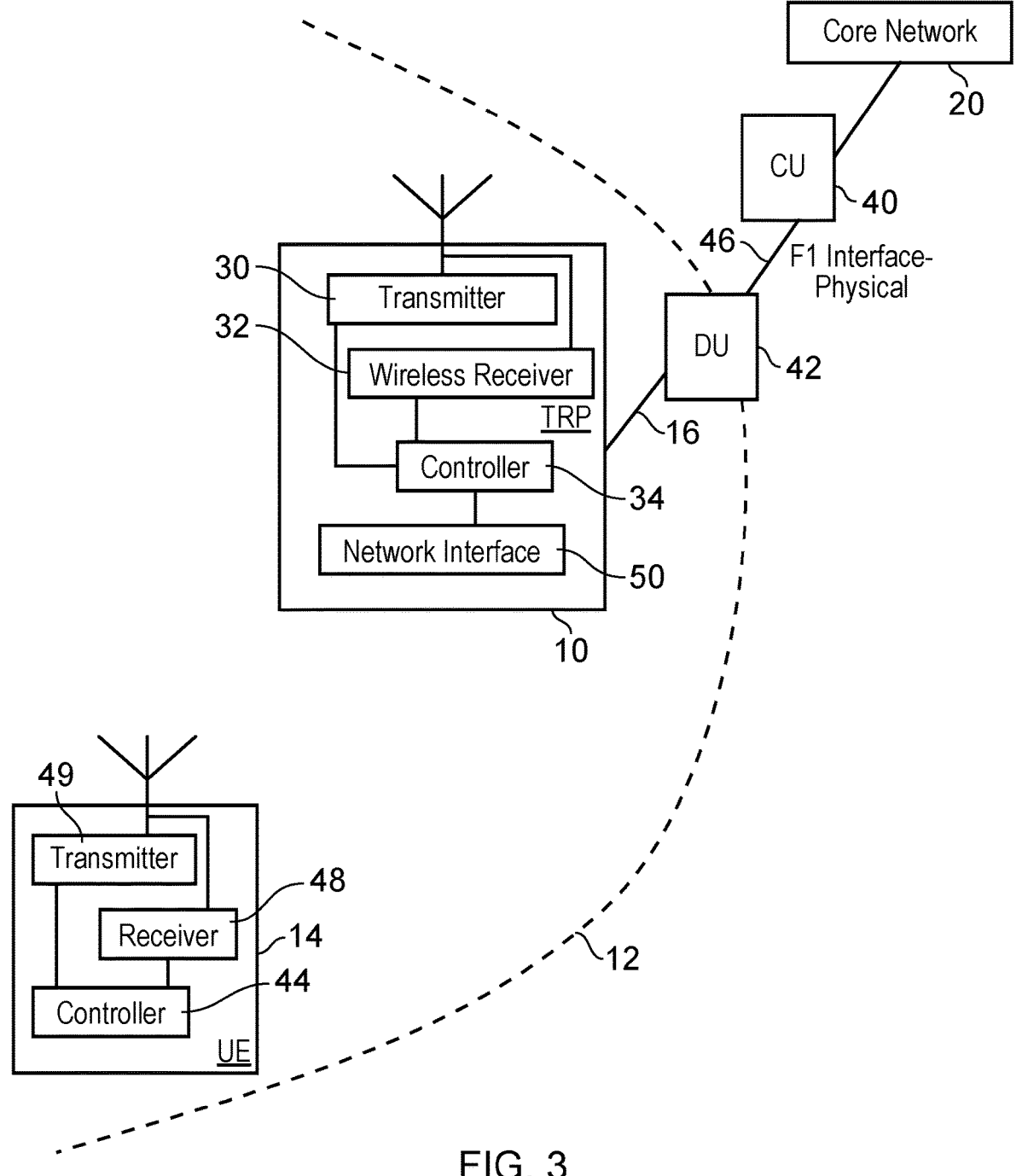
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

eURLLC and NR-U

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable and Low Latency Communications (URLLC) services are for a reliability of $1\text{-}10^{-5}$ (99.999%) or higher (99.9999%) for one transmission of a 32 byte packet is required to be transmitted from the radio protocol layer 2/3 SDU ingress point to the radio protocol layer 2/3 SDU egress point of the radio interface within 1 ms [2]. Massive Machine Type Communications (mMTC) is another example of a service which may be supported by NR-based communications networks. In addition, systems may be expected to support further enhancements related to Industrial Internet of Things (IIoT) in order to support services with new requirements of high availability, high reliability, low latency, and in some cases, high-accuracy positioning.

Enhanced URLLC (eURLLC) [3] [4] specifies features that require high reliability and low latency, such as factory automation, transport industry, electrical power distribution, etc. It should be appreciated that the Uplink Control Information (UCI) for URLLC and eMBB will have different requirements. Hence, one of the current objectives of eURLLC is to enhance the UCI to support URLLC, where the aim is to allow more frequent UCI to be transmitted, such as the transmission of more Hybrid Automatic Repeat Request Acknowledgement (HARQ-ACK) feedback per slot, and to support multiple HARQ-ACK codebooks for different traffic services. Solutions identified to accommodate more frequent UCI without interrupting the high-priority and low-latency data transmissions using Physical Uplink Shared Channels (PUSCHs) can comprise the multiplexing of UCI onto PUSCH repetitions.

Another such service incorporating NR technology is 5G NR in Unlicensed Spectrum (NR-U) [5], which enable devices to make use of shared and unlicensed spectrum bandwidth. Such features as Listen Before Talk (LBT), as specified by [5], may be incorporated into the NR frame structure for NR-U operation in unlicensed bands. One of the objectives of eURLLC as laid out in [4] is to harmonise Configured Grant (CG) PUSCH operations in eURLLC and NR-U.

Channel Access in an Unlicensed Band

In the following paragraphs, an explanation is provided of current proposals for accessing communications from an unlicensed frequency band. In an unlicensed band, two or more systems may operate to communicate using the same communications resources. As a result, transmissions from different systems can interfere with each other especially when for example, each of the different systems are configured according to different technical standards, for example WiFi and 5G. As such, there is a regulatory requirement to use an LBT protocol for each transmitter operating in an unlicensed band to reduce interferences among different systems sharing that band. In LBT, a device that wishes to transmit a packet will firstly sense the band for any energy levels above a threshold to determine if any other device is transmitting, i.e. it listens, and if there is no detected transmission, the device will then transmit its packet. Otherwise, if the device senses a transmission from another device it will back-off and try again at a later time.

Figure 4:
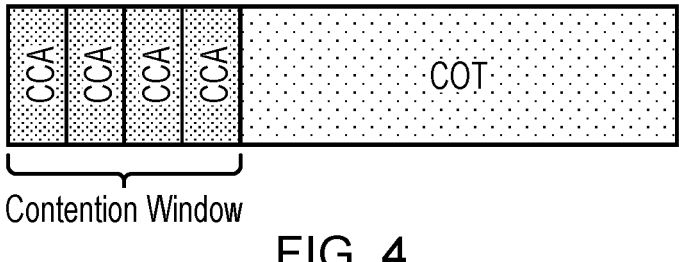
FIG. 4 illustrates an example of a New Radio Unlicensed (NR-U) Channel Access on a grid of radio communications resources.

In NR-U the channel access can be Dynamic (also known as Load Based Equipment) or Semi-Static (also known as Frame Based Equipment). The dynamic channel access schemes consist of one or more Clear Channel Assessment (CCA) phases in a Contention Window followed by a Channel Occupancy Time (COT) phase as shown FIG. 4. LBT is performed during the CCA phase by an NR-U device (e.g. gNB or UE) that wishes to perform a transmission. According to the CCA phase, the NR-U device listens to one or more of CCA slots and if no other transmission is detected (i.e. energy level is determined to below a threshold for the duration of the one or more CCA slots) after the CCA phase, the NR-U device moves into the COT phase where it can transmit its packet in the COT resources. In Dynamic Channel Access (DCA) the CCA and COT phases can be different length between different systems whilst in Semi-static Channel Access, the CCA and COT phases have fixed time window and are synchronised for all systems sharing the band. Further details on channel access in NR-U may be found in co-pending European patent application with application number EP20187799.0 [6].

In NR-U a device can be an initiating device or a responding device. The initiating device acquires the COT by performing CCA and typically it initiates a first transmission, e.g. a gNB transmitting an uplink grant. The responding device receives the transmission from the initiating device and responses with a transmission to the initiating device, e.g. a UE receiving an uplink grant and transmitting the corresponding PUSCH. As will be appreciated a UE can also be an initiating device, for example when it is transmitting a Configured Grant (CG) PUSCH, and the gNB can be a responding device.

There are two types of Dynamic Channel Access (DCA), which are referred to as Type 1 and Type 2. In a Type 1 DCA, a counter N is generated as a random number between 0 and $CW_p$, where a Contention Window size $CW_p$ is set between $CW_{min,p}$ and $CW_{max,p}$. The duration of the COT and the values $\{CW_{min,p}, CW_{max,p}\}$ depend on the value p, which is the Channel Access Priority Class (CAPC) of the transmission. The CAPC may be determined, for example, by a QoS of the transmitting packet. A Type 1 DCA is performed by an initiating device, and once the COT is acquired, one or more responding devices can use Type 2 DCA for their transmissions within the COT. Type 2 DCA may require a short CCA or no CCA prior to transmission if the gap between one transmission of two devices is less than a predefined value, such as, for example, 25 µs. If the gap is greater than this predefined value such as 25 µs, then the responding device needs to perform Type 1 DCA.

Figure 5:
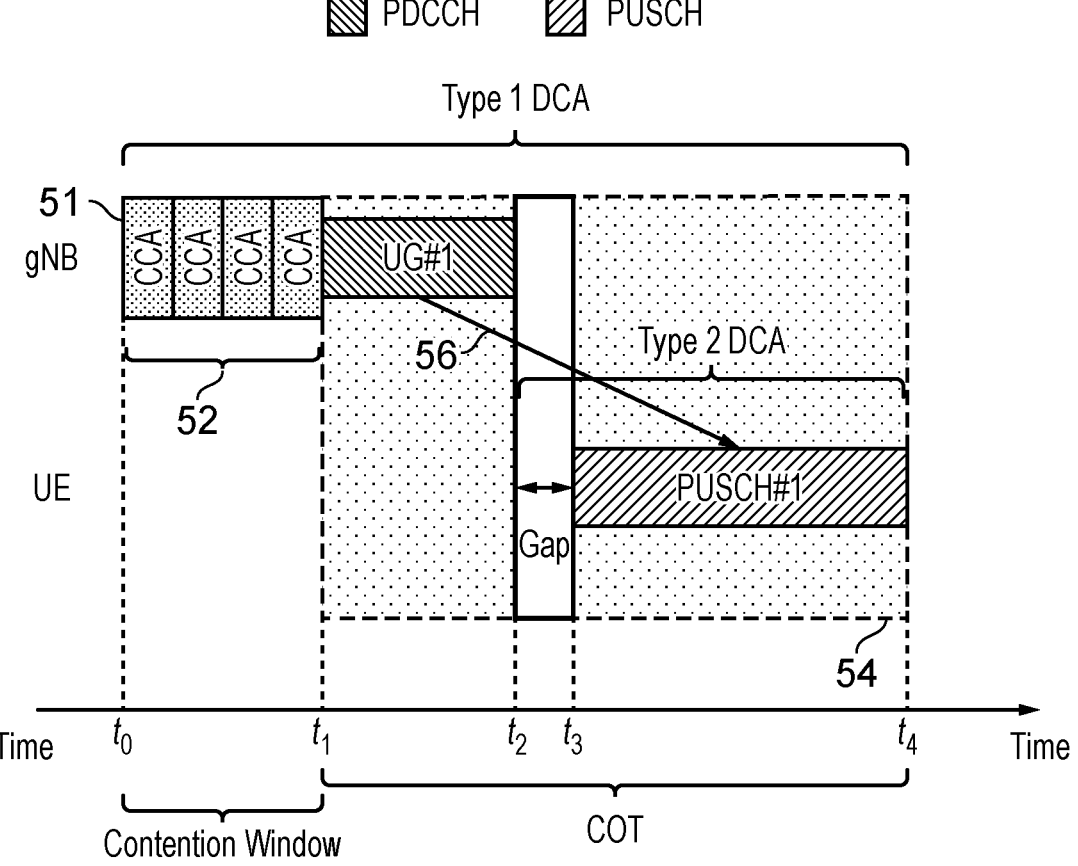
FIG. 5 illustrates an example of Type 1 and Type 2 Dynamic Channel Access on an uplink and downlink grid of radio communications resources.

FIG. 5 provides an illustration of frequency against time for transmission in an unlicensed band. As shown for the example of FIG. 5, an example of a Type 1 DCA transmission and an example of a Type 2 DCA transmission are shown. According to the example shown in FIG. 5, at time $t_0$, the gNB wishes to send an uplink grant, UG #1, to the UE to schedule PUSCH #1. The gNB performs a Type 1 DCA starting with a Contention Window with four CCAs 51, so that for this example random number N=4, and detects no energy during this Contention Window 52, thereby acquiring the COT 54 between time $t_1$ to $t_4$. The gNB then transmits UG #1 to the UE scheduling a PUSCH #1 at time $t_3$ as represented by arrow 56. The UE receiving the uplink grant UG #1 then can use Type 2 DCA if the gap between UG #1 and the start of its PUSCH #1 transmission, between time $t_2$ and $t_3$ is below a threshold, otherwise the UE will have to perform a Type 1 DCA. This is to say, if the granted PUSCH #1 is less than a threshold time from the gNB's transmission of the uplink grant UG #1 or other gNB transmissions, then the UE is not required to make a contention itself for the resources on the unlicensed band by transmitting in the CCA and then COT according to the Type 1 DCA.

Figure 6:
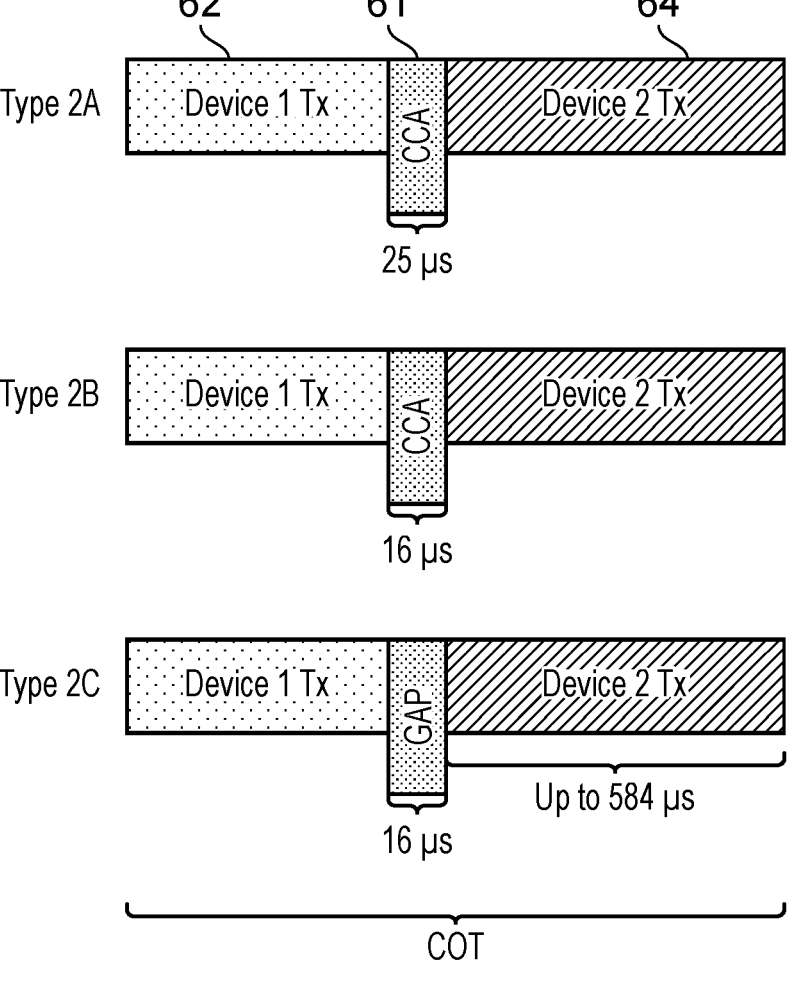
FIG. 6 illustrates examples of Type 2 Dynamic Channel Access on a grid of radio communications resources.

There are three types of Type 2 DCA, as shown in FIG. 6, which are defined with respect to a length of the gap 61 between transmission 62 by a first device (initiating device) and transmission 64 by a second device (responding device) within a COT, and are therefore defined by whether the second responding device needs to perform a CCA. These types are:

Type 2A: The gap between two transmissions is not more than 25 µs and the UE performs a single contentious channel access (CCA) within this gap 61;

Type 2B: The gap between two transmissions is not more than 16 µs and the UE performs a single CCA within this gap 61; and Type 2C: The gap between two transmissions is not more than 16 µs no CCA is required within this gap 61.

A COT can be shared by multiple devices; i.e., a gNB can initiate the COT which it can then share with one or more UE. For example, a gNB can initiate a COT, and then can transmit an UL Grant to a UE, and the UE can then use this COT to transmit the PUSCH. A device using a COT initiated by another device may not need to perform CCA, or may need to perform just a short CCA. Those skilled in the art would appreciate that a UE can also initiate a COT.

Rel-15 Configured Grant

As is well understood by those skilled in the art, a UE uses a Physical Uplink Shared Channel (PUSCH) for uplink data transmission. The PUSCH resources used for the transmission of the PUSCH can be scheduled by a gNB using a Dynamic Grant (DG) or a Configured Grant (CG).

In a Dynamic Grant PUSCH (DG-PUSCH), the UE typically sends a Scheduling Request (SR) to the gNB when uplink data arrives at its buffer. In response to receiving the SR, the gNB would then send an Uplink Grant, e.g. via Downlink Control Information (DCI) using DCI Format 0_0, 0_1 or 0_2, carried by a Physical Downlink Control Channel (PDCCH) to the UE where this Uplink Grant schedules resources for a PUSCH. The UE then uses the scheduled PUSCH (i.e. DG-PUSCH) to transmit its uplink data.

It is observed that the use of DG-PUSCHs introduces latency, since the UE needs to initiate an SR and has to wait for an Uplink Grant before it is scheduled PUSCH resources. For regular and periodic traffic, DG-PUSCH would lead to multiple SR and Uplink Grants being sent which is not an efficient use of resources. Hence, recognising the drawbacks of DG-PUSCH, Configured Grant PUSCH (CG-PUSCH) is introduced in NR. In CG-PUSCH, the UE is pre-configured using RRC configuration periodic PUSCH resources, such that the UE can transmit its uplink data in any of these regularly occurring CG-PUSCH resources without the need to request it with an SR. There are two types of CG-PUSCH:

Type 1 CG-PUSCH: Once the CG-PUSCH resource is configured by RRC, the UE can use it without activation; and Type 2 CG-PUSCH: The CG-PUSCH resource is firstly RRC configured. The UE can only use the CG-PUSCH resource if it receives an activation DCI, which is an UL Grant with a Configured Scheduling-Radio Network Temporary Identifier (CS-RNTI). Once the CG-PUSCH is activated the UE can use it until it is deactivated by another DCI. Type 2 CG-PUSCH provides better control for the gNB scheduler and therefore more efficiently utilises resources.

Figure 7:
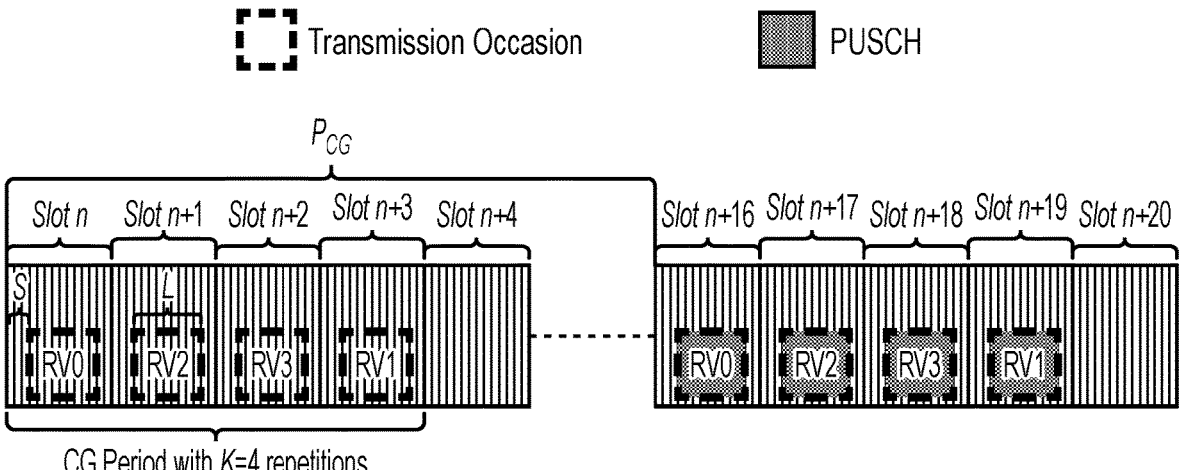
FIG. 7 illustrates the time-domain parameters for a Configured Grant Physical Uplink Shared Channel (CG-PUSCH)

In the time domain, a CG-PUSCH consists of a periodicity $P_{CG}$, repetitions K={1, 2, 4, 8}, duration L of the PUSCH and starting symbol offset relative to slot boundary S of the PUSCH. An example is shown in FIG. 7, where the CG-PUSCH has a periodicity $P_{CG}$=224 symbols (or 16 slots), repetition of K=4, duration of L=9 symbols and a starting symbol S=3 symbols from the start of slot boundary. The CG-PUSCH consists of Transmission Occasions (TO), where a TO is an opportunity for the UE to transmit uplink data. It should be noted here that the UE does not need to use a TO, i.e. a CG-PUSCH resource, if it has no uplink data to transmit. For example, in Slot n, the UE does not have any uplink data and so it does not transmit anything in the TOs for that CG period but in the next CG Period starting in Slot n+16, the UE has uplink data and therefore uses the TOs in that CG Period to transmit four repetitions of the uplink data.

Figure 8:
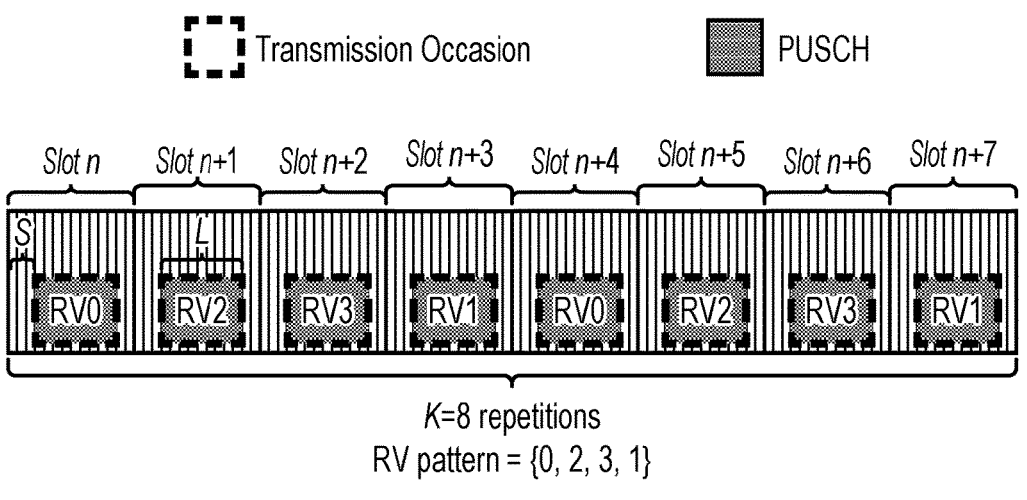
FIG. 8 demonstrates how Redundancy Version (RV) patterns restart during PUSCH repetitions.

The first TO in a CG Period is associated with Redundancy Version RV=0. A Redundancy Version may be associated each repetition of a transmitted transport unit or block, where different Redundancy Versions may include a different amount of encoded information. If repetition K>1, then each TO in the CG Period is associated with a RRC configured RV pattern, where the RV pattern can be {0, 2, 3, 1}, {0, 3, 0, 3} and {0, 0, 0, 0}. The RV pattern is configured in RRC parameter repK-RV. For example, in FIG. 7, the RV pattern={0, 2, 3, 1}. The first PUSCH transmission in a CG Period must always start with RV=0. For repetition K=8, the RV pattern is cycled after the fourth repetition; i.e. the RV pattern restarts after the fourth repetition. For example, in FIG. 8, the RV pattern={0, 2, 3, 1} and K=8 repetitions. Here the UE cycles the RV at the fifth repetition, where the RV pattern is restarted at the fifth TO of the CG period in Slot n+4.

Since HARQ is used for PUSCH transmission, each PUSCH is associated with a HARQ Process Number (HPN) where they are 16 HARQ processes, i.e. HPN=0 to 15. In DG-PUSCH, the HPN is indicated in the UL Grant. For CG-PUSCH, since there is no UL Grant, each CG period is associated with a HPN and is dependent upon the starting symbol $O_{CG}$ (in units of symbols) of the first TO in a CG period relative to SFN=0, the periodicity $P_{CG}$ (in units of symbols) and the number of HARQ processes $N_{HARQ}$ configured for the CG-PUSCH [7] (i.e. the gNB can configure less than 16 HARQ processes for a CG-PUSCH), i.e.:

$$HPN = \left\lfloor \frac{O_{CG}}{P_{CG}} \right\rfloor MOD N_{HARQ}$$

Where $\lfloor \cdot \rfloor$ is the Floor function and $O_{CG}$ is relative to first symbol of the first slot of radio frame with SFN=0.

Retransmission of a CG-PUSCH is scheduled using an UL Grant. That is, a DG-PUSCH is used for the retransmission of a CG-PUSCH that is not decoded successfully at the gNB. If the UE does not receive an UL Grant for the retransmission of a CG-PUSCH within a pre-configured timer $T_{CG-ACK}$, the UE will consider that the CG-PUSCH has been received successfully.

Rel-16 eURLLC CG-PUSCH

Since the first CG-PUSCH transmission must use a TO with RV=0, if the UE misses that TO, it may not be able to transmit any PUSCH in that CG Period. For example, referring back to FIG. 7, if the uplink data arrives at the UE buffer in Slot n+1, then the UE may only be ready to transmit a PUSCH in Slot n+2 but the TO in Slot n+2 corresponds to RV=3 and so the UE cannot starts its PUSCH transmission. It then has to wait till the next CG Period in Slot n+16 for a TO with RV=0 to start its transmission. This introduces latency for the PUSCH transmission, which may not meet the stringent latency requirement in URLLC.

Figure 9:
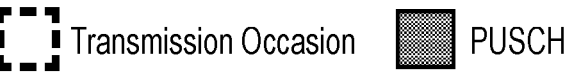
FIG. 9 shows an example of how a UE may be unable to complete PUSCH repetition transmissions.
Figure 9:
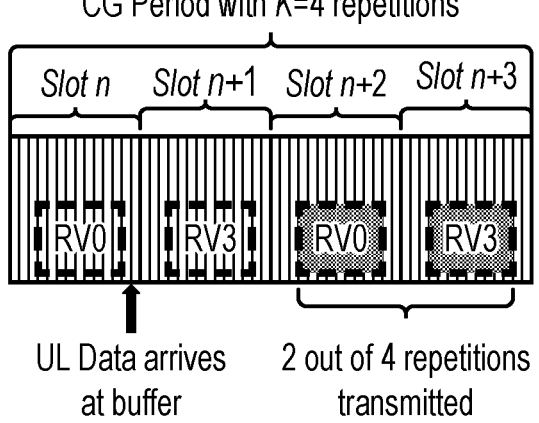

In order to improve reliability, PUSCH is transmitted using repetitions, as has been mentioned above. For CG-PUSCH, if the uplink data does not arrive before the first TO of a CG Period, the UE may not be able to transmit the required number of repetitions, even if there are multiple TOs with RV=0 within that CG Period. For example, in FIG. 9, a CG-PUSCH is configured with K=4 repetitions and an RV pattern {0, 3, 0, 3} thereby allowing two TOs where the first PUSCH transmissions can start (i.e. the first and third TOs). Uplink data arrives at the UE buffer at the end of Slot n, thereby missing the first TO of the CG Period. Since the UE has to start its PUSCH transmission in a TO with RV=0, the PUSCH is transmitted in Slot n+2, i.e. the closest TO with RV=0. However, there are only two TOs left in that CG Period and so the UE is only able to transmit two out of the targeted four repetitions. The reduced PUSCH repetition transmissions may not meet the strict reliability requirement for URLLC.

Figure 10:
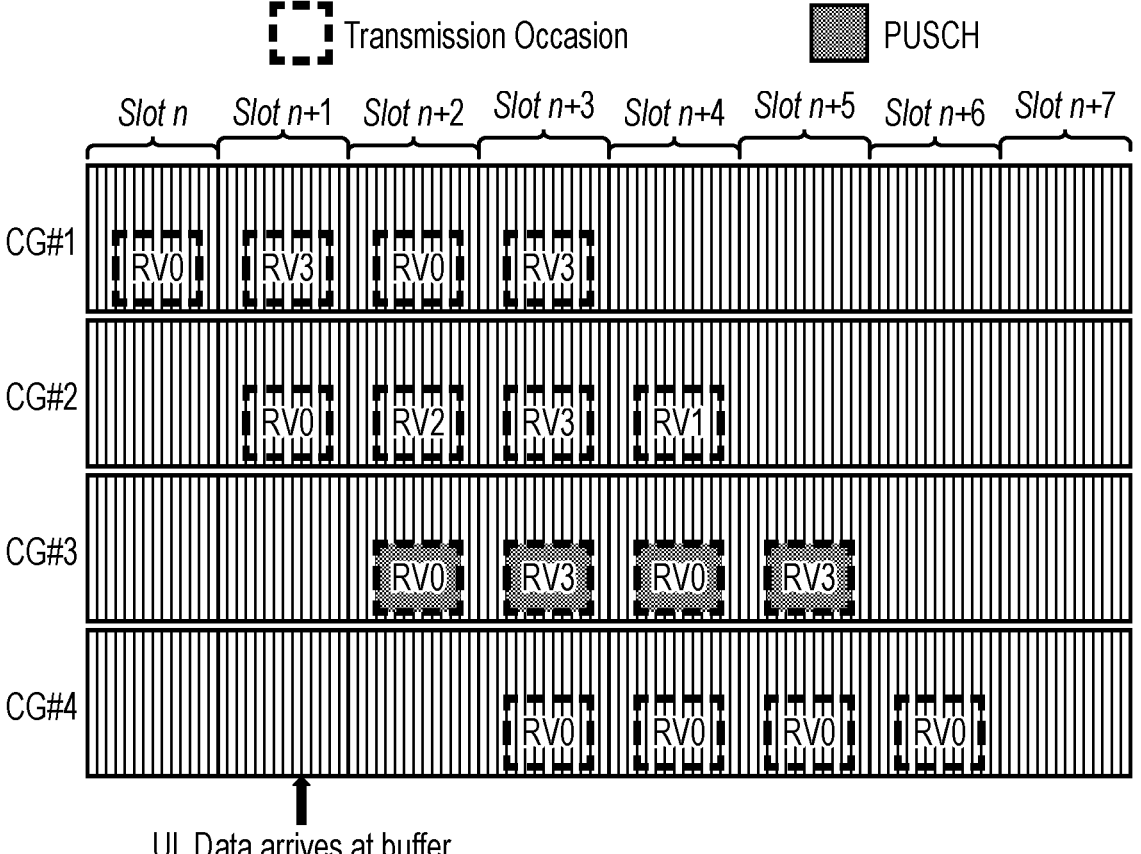
FIG. 10 illustrates an example of multi CG-PUSCH.

Recognising the drawbacks of Rel-15 CG-PUSCH, multi CG-PUSCH was introduced for Rel-16 eURLLC, where a UE can be configured with up to 12 CG-PUSCH where each CG-PUSCH can be independently configured. A configuration can be made such that different CG-PUSCHs start at different times so that UE has multiple opportunities to transmit its PUSCH. For example, in FIG. 10, a UE is configured with four CG-PUSCHs, labelled as CG #1, CG #2, CG #3 and CG #4 and each with repetition K=4. These CG-PUSCHs are configured such that they start with one slot offset of each other. At Slot n+1, uplink data arrives at the UE's buffer and the possible TOs that the UE can use to start its PUSCH transmissions are the third TO (Slot n+2) of CG #1, the first TO (Slot n+2) of CG #3 and the first TO (Slot n+3) of CG #4. In order to ensure K=4 repetitions, the UE can use CG #3 or CG #4 but since CG #3 offers the lowest latency, the UE selects CG #3 for its PUSCH transmissions thereby ensuring K=4 repetitions and minimizing latency. It would be appreciated by those skilled in the art that the staggering of multiple CG-PUSCH resources as shown in FIG. 10 is just one possible configuration to ensure K repetitions are sent with minimum latency. The gNB is free to configure other arrangements as each CG-PUSCH can be individually configured.

For Type 2 CG-PUSCH, a CG-PUSCH can be individually activated using the four-bit HPN field in an UL Grant. For deactivation, one or more CG-PUSCHs can be indicated for deactivation using the 16 states in the HPN field, where each state can be configured to indicate a combination of CG-PUSCHs for deactivation.

There are two PUSCH mapping types:
Type A: Where the PUSCH starts at the beginning of the slot, i.e. the symbol offset S=0; and
Type B: Where the PUSCH can start at any symbol within the slot, i.e. S=0 to 13.

In Rel-15, slot based PUSCH repetition, known as PUSCH Aggregation, is introduced to improve the reliability of the PUSCH transmission. An example is shown in FIG.

11, where a Type B PUSCH of four symbols duration, i.e. L=4, which starts with two symbols offset from the slot boundary is repeated four times, i.e. K=4, using PUSCH Aggregation starting from slot n to slot n+3. The number of repetitions for PUSCH Aggregation is RRC configured.

Figure 11:
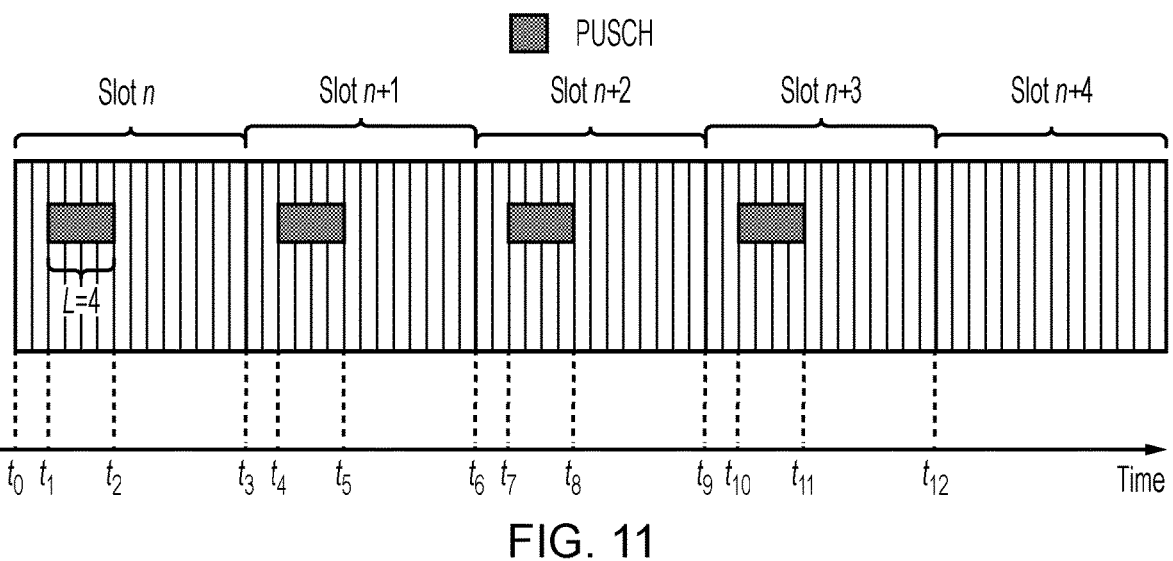
FIG. 11 shows an example demonstrating the operation of Rel-15 PUSCH Aggregation.
Figure 12:
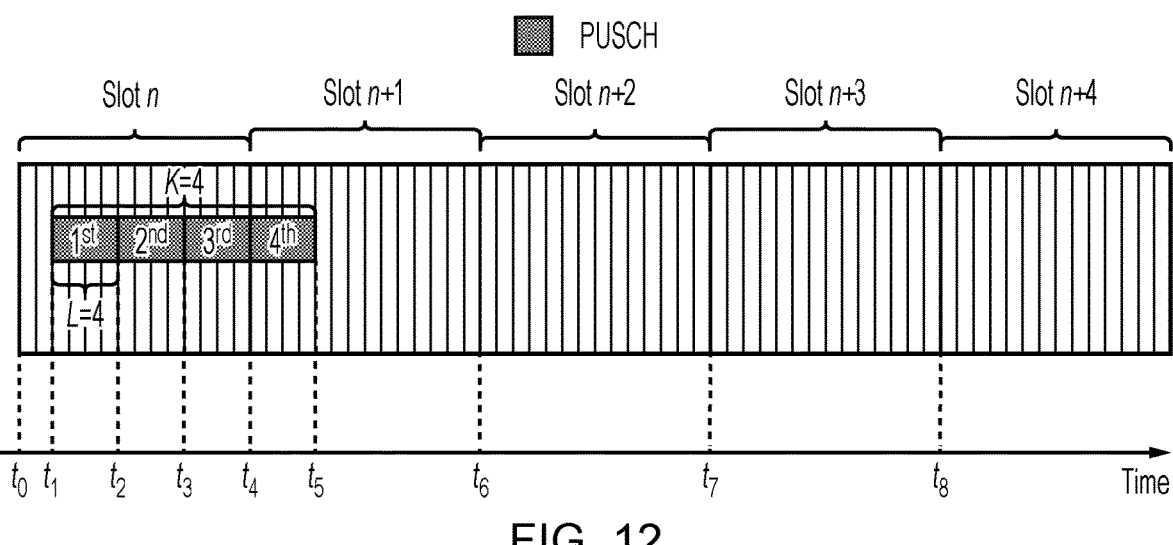
FIG. 12 shows an example demonstrating the operation of Rd-16 enhanced Type B (e-Type B) PUSCH Repetition.

In PUSCH Aggregation i.e. the slot based PUSCH repetition, where the PUSCH duration is less than a slot, time gaps between repetitions are observed. For the example in FIG. 11, the PUSCH is repeated at the slot level leaving a gap of 10 symbols between successive repetitions. Such gaps introduce latency and therefore are not acceptable for URLLC. Recognising this, in Rel-16 eURLLC, Enhanced Type B PUSCH Repetition (e-Type B PUSCH) is introduced where the PUSCH repetition are repeated back-to-back, thereby minimising latency whilst improving reliability. An example is shown in FIG. 12, where a four symbol duration PUSCH, L=4, with two symbols offset from the slot boundary, is repeated four times, i.e. $K_N$=4, using Rel-16 PUSCH Repetition. Here, there are no gaps between each repetition, thereby completing the entire repetitions within 16 symbols as compared to 56 symbols (four slots) when using PUSCH Aggregation. Enhanced Type B PUSCH repetition is supported in DG-PUSCH and CG-PUSCH for Rel-16 eURLLC. In DG-PUSCH, the number of repetitions is indicated in the UL Grant, whilst for CG-PUSCH, the repetition number is RRC configured in the parameter repK.

Figure 13:
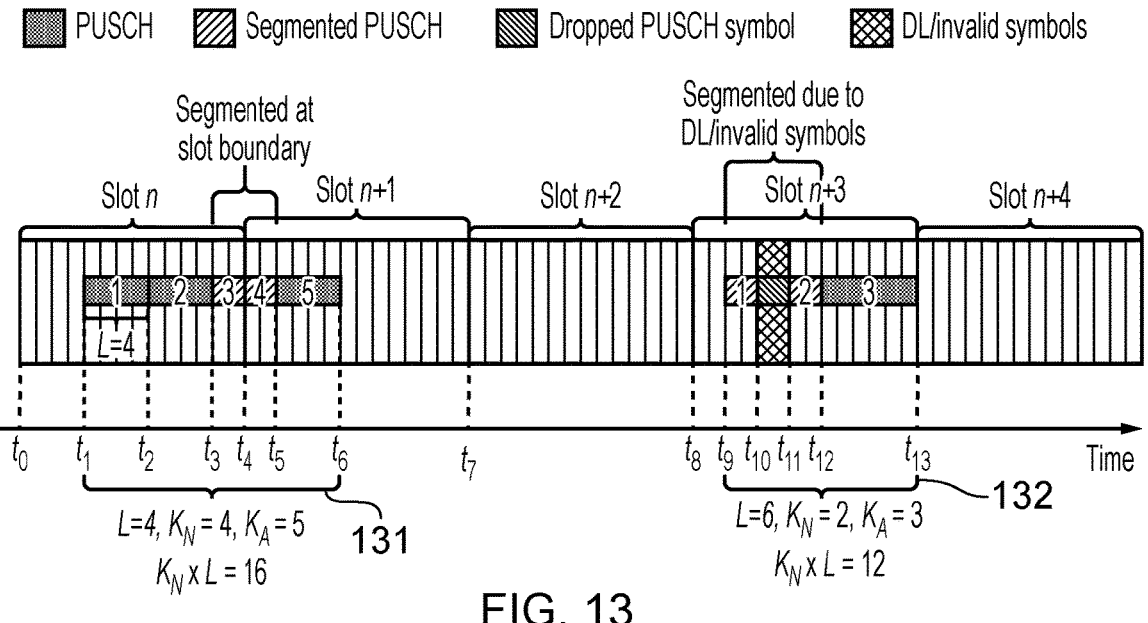
FIG. 13 illustrates an example of PUSCH segmentation.

Since e-Type B PUSCH can start at any symbol within a slot, some of its repetitions may cross a slot boundary, or may collide with an invalid OFDM symbol, e.g. a Downlink symbol and these PUSCHs are segmented. A PUSCH repetition that is scheduled e.g. by an UL Grant or configured for a CG-PUSCH is known as a nominal repetition and if segmentation occurs on a nominal PUSCH into two or more PUSCH segments, these segments are called actual repetitions $K_A$, i.e. actual repetitions are PUSCH repetitions that are actually transmitted, which can therefore be larger than the number of nominal repetitions, i.e. the scheduled number of repetitions. The PUSCH duration L and nominal repetition number $K_N$ that are scheduled by an UL Grant or configured for a CG-PUSCH gives the absolute total duration of the PUSCH transmission; that is $K_N \times L$ is the duration of the entire PUSCH transmission and so any parts of the PUSCH transmission collides with any invalid OFDM symbols, those parts are dropped. FIG. 13 shows two examples of PUSCH segmentation. At time $t_1$, a PUSCH 131 with $K_N$=4, L=4 is transmitted, where the third nominal PUSCH repetition crosses the slot boundary at time $t_4$. Consequently, the third nominal PUSCH repetition is segmented into two PUSCH repetitions and therefore the actual number of repetitions $K_A$=5. At time $t_9$, another PUSCH 132 with $K_N$=2, L=6, is transmitted, where the first nominal PUSCH repetition collides with 2 DL (or invalid) symbols between time $t_{10}$ and $t_{11}$. Consequently, the first nominal PUSCH repetition is segmented into two PUSCH repetitions and therefore the actual number of repetitions $K_A$=3. Since $K_N \times L$=12 OFDM symbols, is the total duration of the PUSCH transmission 132, the two PUSCH symbols that collide with the DL (or invalid) symbols between time $t_{10}$ and $t_{11}$ are therefore dropped.

In Rel-15, there are no priority levels at the Physical Layer, and when two UL transmissions collide, their information is multiplexed and transmitted using a single channel. The possible collisions are that between a Physical Uplink Control Channel (PUCCH) and another PUCCH and between a PUCCH and a PUSCH. It should be noted that priority levels are defined for the MAC layer in Rel-15, where there are 16 priority levels.

A UE can be configured to provide eMBB and URLLC services. Since eMBB and URLLC have different latency requirements, their uplink transmissions may collide. For example, after an eMBB uplink transmission has been scheduled, an urgent URLLC packet may arrive, which would need to be scheduled immediately and so its transmissions may collide with the eMBB transmission. In order to handle such intra-UE collisions with different latency and reliability requirements, two priority levels at the Physical Layer were introduced in Rel-16 for uplink transmissions, i.e. PUCCH and PUSCH. In Rel-16 intra-UE prioritisation is used; that is, when two UL transmissions with different Physical Layer priority levels (L1 priority) collide, the UE will drop the lower priority transmission. If both UL transmissions have the same L1 priorities then the UE may reuse Rel-15 procedures (i.e. the UL transmissions are multiplexed and transmitted using a signal channel) For CG-PUSCH, the L1 priority is RRC configured for each CG-PUSCH in the RRC parameter phy-PriorityIndex-r16.

Rel-16-NR-U CG-PUSCH

Figure 14:
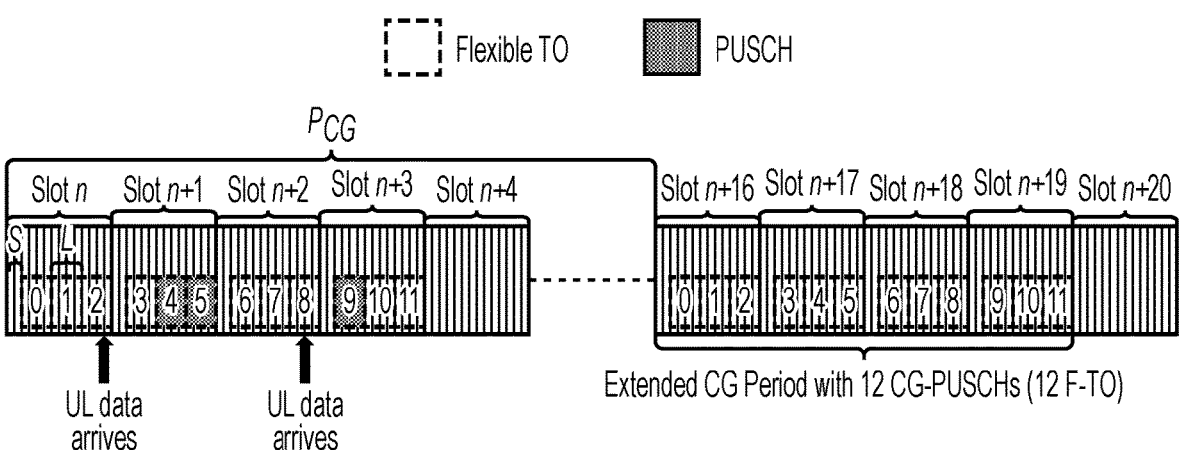
FIG. 14 shows an example of how Flexible Transmission Occasions (F-TOs) may be utilised.

Since LBT is required for a transmission, the UE may not be able to access a CG-PUSCH Transmission Occasion (TO), especially one that is associated with RV=0. Hence, recognising this, in Rel-16 NR-U, the TO is increased in each CG Period by extending the CG Period to cg-nrofSlots-r16 (1 to 40) slots, where each slot contains cg-nrofPUSCH-InSlot-r16 (1 to 7) consecutive CG-PUSCHs. The parameters cg-nrofSlots-r16 and cg-nrofPUSCH-InSlot-r16 are RRC configured per CG-PUSCH. The UE can start a PUSCH transmission in any of these CG-PUSCHs resource within the CG Period, instead of being limited to specific TOs with RV=0 in the legacy system as described above. Hence, effectively in each CG Period, the UE is provided with cg-nrofSlots-r16×cg-nrofPUSCH-InSlot-r16 Flexible TOs, and so the UE has multiple opportunities for LBT attempts to transmit its PUSCH. It should be noted that in 3GPP these TOs are called multi CG-PUSCH, but to avoid confusing these with Rel-16 eURLLC Multi CG-PUSCH as described above, these TOs are referred to herein as Flexible TOs (F-TO). An example is shown in FIG. 14, where $P_{CG}$=224 symbols (16 slots), S=2 symbols, L=4 symbols, cg-nrofSlots-r16=4 and cg-nrofPUSCH-InSlot-r16=3, which gives 12 Flexible TOs per CG Period. At the end of Slot n, UL data arrives at the UE buffer and the UE attempts to transmit it in the next F-TO, i.e. TO #3 in Slot n+1. However, the UE here in the example shown in FIG. 14 fails the LBT process and so it attempts another LBT on TO #4, in which case it is successful. The UE then transmits two PUSCH using TO #4 and TO #5 in Slot n+1 (which could be for different TBs or HPN). At the end of Slot n+2, further UL data arrives at the UE's buffer and it attempts LBT on the next F-TO, i.e. TO #9 in Slot n+3 and is successful, thereby transmitting the PUSCH in this slot.

For a CG-PUSCH transmission, the UE may need to perform the CCA and initiate a COT. The UE can share the COT with the gNB, for example, to allow the gNB to send feedback signals for its CG-PUSCH transmissions. The DL resources within the COT for the gNB are indicated by the UE in a CG-UCI. Here, the UE indicates an index to an entry in a lookup table containing the slot offset $O_{DL}$ where the DL transmission can start, and the duration in slots $L_{DL}$ of the DL transmission. The lookup table is RRC configured with a configurable $C_{DL}$ entries and they are in the cg-COT-SharingList-r16 parameter. One of the entries in this lookup table indicates "No Sharing". The slot offset $O_{DL}$ is relative to the end of the slot containing the CG-UCI indicating the COT Sharing DL resources. An example is of a "cg-COT-SharingList-r16" configuration with $C_{DL}=4$ entries as shown in Table I.

TABLE I

| DL resources for UE initiated COT sharing (cg-COT-SharingList-r16) | | |
| --- | --- | --- |
| Index | $O_{DL}$ (slots) | $L_{DL}$ (slots) |
| 0 | No Sharing | No Sharing |
| 1 | 3 | 2 |
| 2 | 2 | 4 |
| 3 | 1 | 1 |

Figure 15:
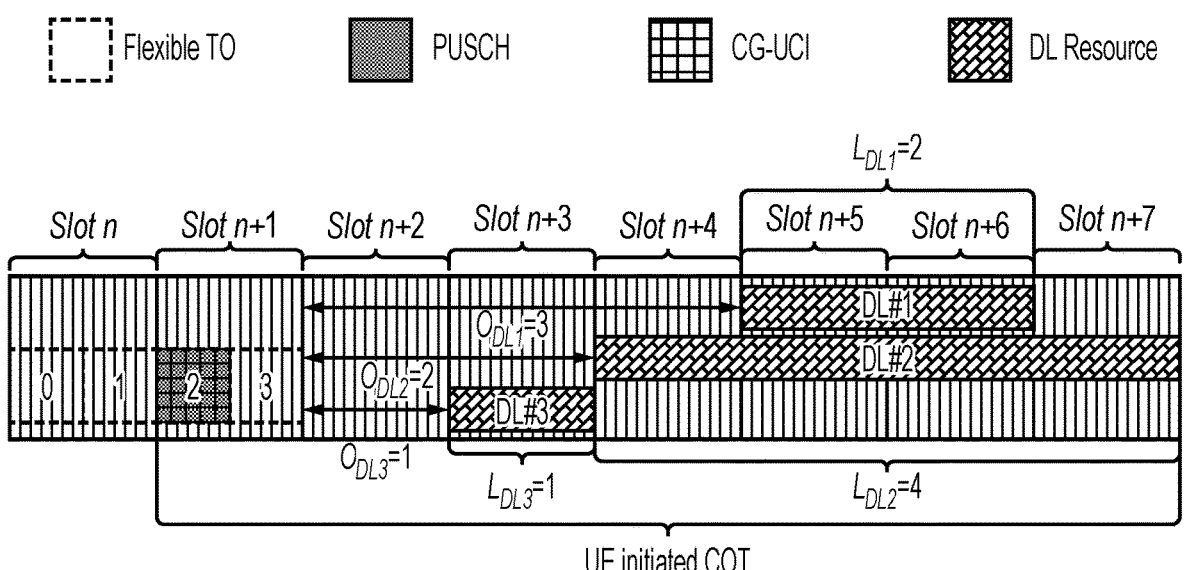
FIG. 15 illustrates an example of UE-initiated Channel Occupancy Time (COT) sharing.

FIG. 15 illustrates an example operation using the example configuration of Table I. Here, we label the offsets and DL resources according to their indices; i.e. Om, $O_{DL2}$ and $O_{DL3}$ are offsets for indices 1, 2 and 3 respectively. Similarly, DL #1, DL #2 and DL #3 are DL resources for indices 1, 2 and 3 respectively, with duration $L_{DL1}$, $L_{DL2}$ and $L_{DL3}$ respectively. Resource for index 0 is not shown since it indicates "No Sharing". In FIG. 15, the UE has a CG Period with four F-TOs (i.e. cg-nrofSlots-r16=2 and cg-nrofPUSCH-InSlot-r16=2), the UE manages to acquire TO #2 for its PUSCH transmission and thereby acquiring a COT that is seven slots long. In the PUSCH transmission, the UE multiplexes CG-UCI containing COT Sharing Information where it indicates one of the three available DL resources that the gNB can use for HARQ-ACK feedback for its PUSCH transmission. Since the CG-UCI is in Slot n+1, the slot offsets $O_{DL1}$, $O_{DL2}$ and $O_{DL3}$ are relative to the end of Slot n+1.

In Rel-15 and Rel-16 eURLLC, the HPN and RV of each CG-PUSCH transmission is fixed for each TO and known to the gNB. However, since Flexible TOs are used in Rel-16 NR-U, where the UE can use any of the TOs for a first PUSCH transmission, and where different TBs (i.e. with different HPNs) can be transmitted in a CG Period, the gNB needs to know the HPN and the RV of each of these CG-PUSCHs. In order to provide this information to the gNB, CG Uplink Control Information (CG-UCI) is introduced for Rel-16 NR-U which consists of the following fields [8]:

HARQ Process Number (HPN), which is indicated using 4 bits of the CG-UCI;

Redundancy Version (RV), which is indicated using 2 bits of the CG-UCI;

New Data Indicator (NDI), which is indicated using 1 bit of the CG-UCI; and

COT sharing information which is indicated using a number of bits of the CG-UCI equal to $\log_2 C_{DL}$, where $C_{DL}$ is the number of entries in a lookup table indicating the locations of DL resources that the gNB can use within the UE initiated COT.

The CG-UCI is multiplexed into the CG-PUSCH transmission.

In Rel-15 and Rel-16 eURLLC, an implicit HARQ-ACK feedback is used for CG-PUSCH, where a NACK is implicitly indicated with an UL Grant scheduling a retransmission for the CG-PUSCH, and the timer $T_{CG-ACK}$ is used to implicitly indicate an ACK.

For Rel-16 NR-U, an explicit HARQ-ACK is used for CG-PUSCH, which is carried by Downlink Feedback Information (DFI). The DFI is carried by the PDCCH and it contains a 16-bit bitmap indicating the ACK/NACK for each HPN where "1" indicates ACK and "0" indicates NACK.

Figure 16:
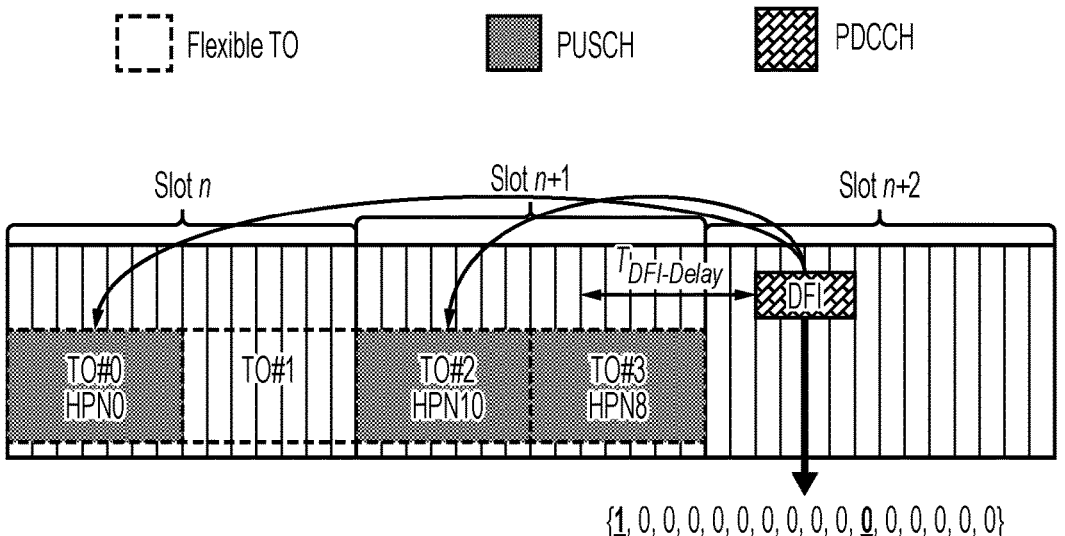
FIG. 16 illustrates an example demonstrating how a minimum Downlink Feedback Information (DFI) delay may indicate for which of a plurality of TOs feedback carried by DFI relates.

The HARQ-ACK feedbacks in the DFI are applicable not only for CG-PUSCHs but also for DG-PUSCHs that are transmitted at least $T_{DFI-Delay}$ symbols prior to the start of the DFI. $T_{DFI-Delay}$ is RRC configured in parameter cg-minDFI-Delay-r16. An example is shown in FIG. 16, where a CG Period consists of four F-TOs and the UE transmits PUSCH on TO #0, TO #2 and TO #3 with HPN=0, HPN=10 and HPN=8 respectively. The $T_{DFI-Delay}=7$ symbols and in this example the DFI can only feedback HARQ-ACKs for TO #0 and TO #2, which are indicated in the first and eleventh positions respectively in the DFI bitmap according to their HPN (these are indicated as bold and underlined in FIG. 16). Since TO #3 ends with fewer than $T_{DFI-Delay}$ symbols before the start of the DFI, the HARQ-ACK for TO #3 is not represented in the DFI and is indicated as "0" regardless whether it is an ACK or NACK.

The DFI does not indicate any uplink resource for the UE, and so the retransmission of a CG-PUSCH is transmitted using another CG-PUSCH resource. The gNB determines that a CG-PUSCH is a retransmission using the NDI and HPN fields of the CG-UCI. The UE can also decide on the RV of the retransmission (or the first transmission) since it can be indicated in the CG-UCI.

The transmission of the DFI is not guaranteed since the gNB has to perform LBT especially for scenario where the DFI is not transmitted within the UE initiated COT. A retransmission timer $T_{CG-ReTx}$ is introduced for Rel-16 NR-U, which is started after a CG-PUSCH transmission. If this retransmission timer expires without the UE receiving an explicit HARQ-ACK (i.e. a DFI) from the gNB, the UE will retransmit that CG-PUSCH.

Example Embodiments Relating to CG-PUSCH and NR-U

Therefore, as described above, CG-PUSCH for Rel-16 eURLLC and CG-PUSCH for Rel-16 NR-U have been specified in parallel, and thus there are some aspects of NR-U CG-PUSCH that may not be suitable for eURLLC operation. One such aspect is CG-PUSCH for Rel-16 eURLLC may contain repetitions (for example, e-Type B PUSCH repetition). However, repetitions are currently not configured for NR-U CG-PUSCH. Embodiments of the present disclosure propose enhancements to transmission methods for CG-UCI to facilitate eURLLC operation in NR-U.

According to example embodiments a UE performs a method of transmitting uplink data by receiving from the wireless access network a configured grant, CG-PUSCH of a wireless access interface on the physical resources included as part of an unlicensed frequency bandwidth (NR-U). The configured CG-PUSCH resources provide a plurality of flexible TOs for the UE to transmit uplink transport blocks. The flexible TOs are accessible for transmission according to a contentious access procedure of the wireless access interface in the unlicensed frequency bandwidth. The uplink transport blocks are scheduled for transmission as a plurality of K repetitions of each of the uplink transport blocks, each repetition being one of a plurality of K RVs, each repetition being scheduled for transmission in one of the flexible TOs of the CG-UCI. The method comprises performing the contentious access procedure to transmit the uplink transport blocks as one or more of the plurality of the K repetitions. The method further comprises transmitting for each uplink transport block, transmitted as the one or more of the K repetitions, uplink control information, UCI, relating to the configured grant, CG, the CG-UCI providing an indication for the transmitted one or more K plurality of repetitions, wherein the transmitting the CG-UCI comprises multiplexing the CG-UCI into a subset of the transmitted one or more K plurality of repetitions.

In one example, the uplink control information provided in the CG-UCI relates to the transmission of the uplink transport blocks as the one or more K plurality of repetitions. In some examples the GC-UCI provides an indication of at least the redundancy version for each of the transmitted one or more K plurality of repetitions. In another example, the GC-UCI provides an indication relating to the transmission of the uplink transport blocks as the one or more K plurality of repetitions including an indication of at least a repetition index for each of the transmitted one or more K plurality of repetitions.

By multiplexing the CG-UCI into a subset of the one or more out of the K repetitions actually used, control information, for signalling which out of the one or more K repetitions were actually transmitted, can be transmitted so that these can be decoded by a receiver in the wireless communications network. In accordance with example embodiments, a CG-UCI may be multiplexed into one or more PUSCH repetitions as will be explained in more detail below.

In example embodiments, a CG-UCI for a CG-PUSCH transmission is multiplexed into a first PUSCH repetition in a configured grant period. In some embodiments, the first PUSCH repetition has RV=0. It will be appreciated by one skilled in the art that RV=0 contains all necessary information (i.e. systematic bits) for the first PUSCH repetition to be fully decoded by a gNB. If the CG-UCI were multiplexed in a PUSCH repetition with RV≠0 (such as RV=1, 2 or 3) the gNB would have to wait for an RV=0 PUSCH before it can complete the PUSCH reception.

Figure 17:
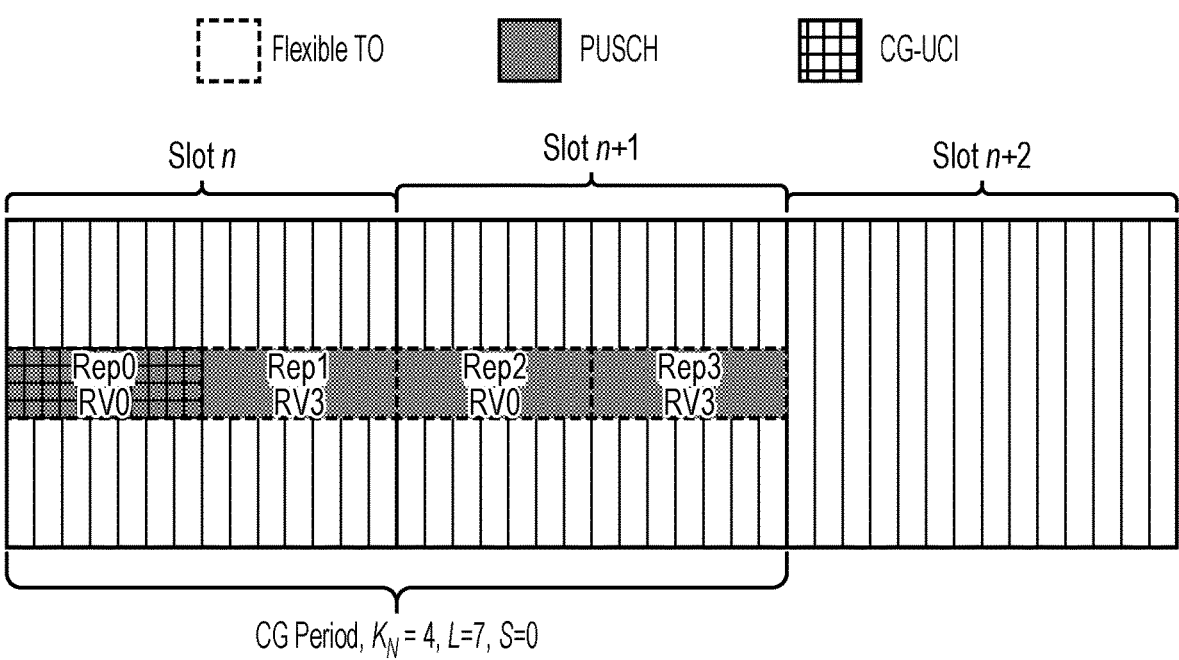
FIG. 17 illustrates multiplexing configured grant uplink control information (CG-UCI) into a first CG-PUSCH repetition in a configured grant period according to example embodiments.

An example of multiplexing the CG-UCI into the first PUSCH repetition in a configured grant period is shown in FIG. 17, where the RRC configured parameter "repK" has a nominal repetition is $K_N$=4, duration L=7 symbols and symbol offset S=0. The configured RV pattern repK-RV={0, 3, 0, 3}. As will be appreciated from FIG. 17, the CG-UCI is multiplexed into the first PUSCH repetition labelled as "Rep0" in FIG. 17.

In example embodiments, the CG-UCI is multiplexed into a plurality of PUSCH repetitions with RV=0. By multiplexing the CG-UCI in a plurality of repetitions, a transmission reliability for the CG-UCI can be increased. In other words, a likelihood of at least one repetition of the CG-UCI being successfully received and decoded by the gNB can be increased.

Figure 18:
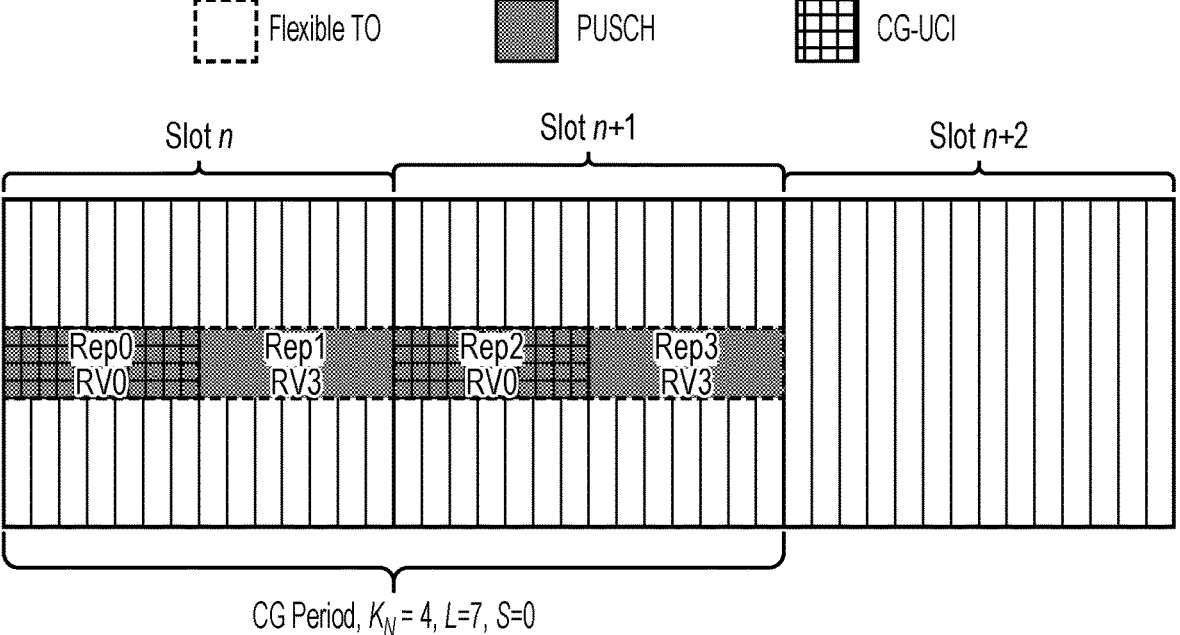
FIG. 18 illustrates multiplexing CG-UCI into a plurality of CG-PUSCH repetitions in a configured grant period according to example embodiments.

An example of multiplexing a CG-UCI into a plurality of PUSCH repetitions with RV=0 in a configured grant period is shown in FIG. 18. As will be appreciated from FIG. 18, the CG-UCI is multiplexed into a first and third PUSCH repetition with RV=0 labelled as "Rep0" and "Rep2" respectively. Although the CG-UCI is multiplexed into two PUSCH repetitions with RV=0 in FIG. 18, it will be appreciated that the CG-UCI may be multiplexed into more than two PUSCH repetitions with RV=0.

In example embodiments, the CG-UCI is multiplexed into one or more PUSCH repetitions (subset of the transmitted K plurality of repetitions) which are actually transmitted (accessed using the contentious access procedure) with at least a pre-defined amount of physical resources, for example, at least $N_{PUSCH}$ resources. As explained above, an actual PUSCH repetition can be a segment of a segmented nominal PUSCH repetition. Such examples can increase a likelihood that there are sufficient physical resources available for the CG-UCI to be multiplexed into.

In some embodiments, the pre-defined amount of physical resources is represented by a pre-defined number of OFDM symbols $N_{PUSCH}$. For example, the pre-defined number of OFDM symbols may be two OFDM symbols. In such an example, the CG-UCI is multiplexed into one or more actual PUSCH repetitions with at least two OFDM symbols of physical resources.

In example embodiments, the CG-UCI is multiplexed into a subset of PUSCH repetitions with the largest amount physical resources in a configured grant period. In such embodiments, the UE may compare the amount physical resources of a plurality of PUSCH repetitions in a configured grant period and select the PUSCH repetition with the largest amount of physical resources for multiplexing the CG-UCI into. In such embodiments, if there are a plurality of PUSCH repetitions with the largest amount of physical resources then the UE may multiplex the CG-UCI into the PUSCH repetition with the largest physical resources occurring at the earliest time in the configured grant period.

In some embodiments, a PUSCH transmission (which may contain one or more PUSCH repetitions) may not occur on consecutive OFDM symbols. For example, a PUSCH repetition may be interrupted if the PUSCH repetition collides with downlink or invalid OFDM symbols. Alternatively, PUSCH Aggregation may be used (as explained above) where time gaps exist between consecutive PUSCH repetitions.

If a PUSCH transmission is interrupted, the UE may have to perform LBT before transmitting any remaining PUSCH repetitions of the PUSCH transmission. In example embodiments, if a PUSCH transmission is interrupted and the UE subsequently performs LBT, a CG-UCI may be multiplexed into an earliest available PUSCH transmission after the interrupted PUSCH transmission. In such embodiments the earliest available PUSCH transmission after the interrupted PUSCH transmission may occur in a different configured grant period to the interrupted PUSCH transmission. In such embodiments, the UE may transmit an indication to the gNB that the earliest available PUSCH transmission after the interrupted PUSCH transmission is a continuation of the interrupted PUSCH transmission. The indication that the earliest available PUSCH transmission after the interrupted PUSCH transmission is a continuation of the interrupted PUSCH transmission may be included in the CG-UCI multiplexed into an earliest available PUSCH transmission after the interrupted PUSCH transmission.

Figures 19, 20:
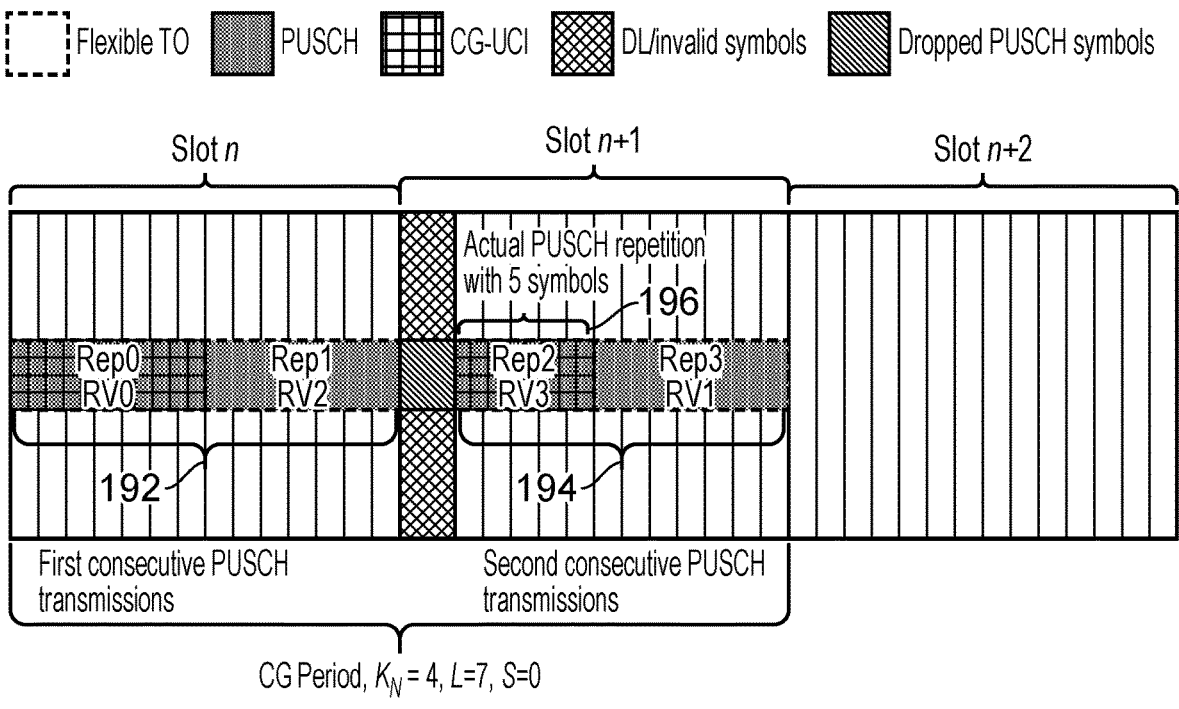
FIG. 19 illustrates multiplexing CG-UCI into a CG-PUSCH repetition after segmentation according to example embodiments.
FIG. 20 illustrates multiplexing CG-UCI into a CG-PUSCH repetition after Listen-Before-Talk (LBT) failure according to example embodiments.

An example of multiplexing a CG-UCI in an earliest available PUSCH transmission after an interrupted PUSCH transmission is shown in FIG. 19. As shown in FIG. 19, K N=4, L=7, S=0 and with RV pattern {0, 2, 3, 1}. In FIG. 19, a first and second PUSCH repetition comprising first consecutive PUSCH transmissions 192 are labelled as "Rep0" and "Rep 1" respectively. As shown in FIG. 19, a CG-UCI is transmitted in the first PUSCH repetition with RV=0. As shown in FIG. 19, a third PUSCH repetition (labelled as "Rep2") collides with two downlink or invalid OFDM symbols of slot n+1. The third PUSCH repetition is therefore segmented into an actual PUSCH repetition 196 with a duration of 5 OFDM symbols. In other words, PUSCH transmission does not occur during the two downlink/invalid symbols. In this example, second consecutive PUSCH transmissions 194 begins on the first OFDM symbol of the actual PUSCH repetition 196 (which is the third OFDM symbol of the third PUSCH repetition). The second consecutive PUSCH transmissions 194 in this case may be regarded as an earliest available PUSCH transmission after an interrupted PUSCH transmission. As shown in FIG. 19, another CG-UCI is multiplexed into the second consecutive PUSCH transmissions 194. In particular, the other CG-UCI is multiplexed into the actual PUSCH repetition 196 in the second consecutive PUSCH transmissions 194. The other CG-UCI multiplexed into the second consecutive PUSCH transmissions 194 may include an indication that the third PUSCH repetition was segmented. It will be appreciated by one skilled in the art, that the actual PUSCH repetition 196 containing the other CG-UCI may be decoded by the gNB despite having RV=3 because the gNB can combine it with the PUSCH with RV=0 that has already been transmitted by the UE in the first PUSCH repetition with RV=0.

In example embodiments, the CG-UCI is multiplexed into a first actual PUSCH repetition in a first available flexible transmission occasion that passes the LBT. An example of multiplexing a CG-UCI into a first actual PUSCH repetition that passes the LBT is shown in FIG. 20. In FIG. 20, the RRC configured parameter "repK" has a nominal repetition of $K_N$=4 with duration L=7 symbols and symbol offset S=0. In FIG. 20, PUSCH cannot be transmitted in a first flexible transmission occasion due to LBT failure. In FIG. 20, a first, second and third actual PUSCH repetition occur in a second, third and fourth flexible transmission occasion respectively with RV pattern {0, 3, 0}, where the second flexible transmission contains the first actual PUSCH repetition that passes the LBT. In this example, a fourth PUSCH repetition with RV=3 (not shown) was dropped. The fourth PUSCH repetition was dropped because, in this example, there are four flexible transmission occasions in the configured grant period as shown in FIG. 20. However, the first transmission occasion encountered LBT failure and could therefore not be used to transmit PUSCH resources. Therefore there were only three flexible transmission occasions remaining in the configured grant period which were used to transmit the first, second and third actual PUSCH repetitions respectively. There was therefore no remaining flexible transmission occasion in the configured grant period for the fourth PUSCH repetition to be transmitted in. The CG-UCI is carried by the first actual repetition in the second transmission occasion. In other words, the CG-UCI is carried by the first actual PUSCH repetition in the first available flexible transmission occasion that passes the LBT.

In example embodiments, a CG-UCI can be divided into a two types. For example, a Type 1 CG-UCI and Type 2 CG-UCI. A Type 1 CG-UCI may contain information such as HPN and COT Sharing Info. A Type 2 CG-UCI may contain other information. For example, the Type 2 CG-UCI may contain incremental information such as Repetition Index or RV.

In some embodiments, Type 1 CG-UCI is multiplexed into a first PUSCH repetition and Type 2 CG-UCI is multiplexed into one or more subsequent PUSCH repetitions. For example, the Type 1 CG-UCI multiplexed into the first PUSCH repetition carries the HPN, NDI, COT Sharing Information and RV whilst Type 2 CG-UCI transmitted in one or more subsequent PUSCH repetitions contain RV. In such embodiments, the UE may have flexibility in deciding which RV to use on each PUSCH repetition. Alternatively, the Type 2 CG-UCI transmitted in the one or more subsequent PUSCH may contain a repetition index. In such embodiments, a gNB receiving the repetition index can keep track of which PUSCH repetition is being received. Such embodiments can reduce the load of CG-UCI.

In example-embodiments, Type 1 CG-UCI is multiplexed into PUSCH repetitions with RV=0 and Type 2 CG-UCI is multiplexed into the other PUSCH repetitions In example embodiments, Type 1 CG-UCI is multiplexed into a first of one or more consecutive PUSCH repetitions. In some examples, the first of one or more consecutive PUSCH repetitions may be a first PUSCH repetition after an interruption to a PUSCH repetition.

Interactions with HARQ-ACK/CSI UCI

In Rel-16 eURLLC, HARQ-ACK and channel system information (CSI) are examples of UCIs carried by PUCCH or PUSCH. If either of HARQ-ACK/CSI UCIs overlap with an e-Type B PUSCH repetition, they are multiplexed into a first overlapping actual PUSCH repetition that has lasts at least one OFDM symbol in time. Accordingly, it may be the case that a CG-PUSCH is multiplexed with HARQ-ACK/CSI UCIs. In such cases, example embodiments provide solutions for multiplexing CG-UCI into CG-PUSCH which may already contain HARQ-ACK/CSI UCIs.

In example embodiments, the UE refrains from multiplexing a CG-UCI into an actual PUSCH repetition containing multiplexed HARQ-ACK/CSI. Such embodiments can ensure a PUSCH repetition is not overloaded with UCIs.

In example embodiments, the UE refrains from multiplexing a CG-UCI into an actual PUSCH repetition containing multiplexed HARQ-ACK/CSI if the HARQ-ACK/CSI UCI occupies more than a pre-determined fraction of PUSCH resources in the actual PUSCH repetition. For example, the pre-determined fraction of the PUSCH resources may be represented by the percentage $M_{PUSCH}$.

In such embodiments, the UE may multiplex the CG-UCI into the actual PUSCH repetition containing the multiplexed HARQ-ACK/CSI if the HARQ-ACK/CSI UCI occupies less than or equal to $M_{PUSCH}$ of the PUSCH resources in the actual PUSCH repetition. Such embodiments can ensure a high reliability for the CG-UCI by not overloading PUSCH resources with UCIs.

In example embodiments, the UE refrains from multiplexing a CG-UCI into an actual PUSCH repetition containing multiplexed HARQ-ACK/CSI if an amount of physical resources remaining in the actual PUSCH repetition after multiplexing the HARQ-ACK/CSI UCI is less than a pre-determined amount. In other words, the UE multiplexes the CG-UCI into the actual PUSCH repetition if the amount of physical resources remaining in the actual PUSCH repetition after multiplexing the HARQ-ACK/CSI UCI is equal to or greater than the pre-determined amount. The pre-determined amount may be represented by $R_{PUSCH}$. The pre-determined amount $R_{PUSCH}$ may be quantified by a number of bits or number of Resource Elements (REs) for example. Such embodiments can improve a reliability of the CG-UCI by ensuring that there are sufficient bits for the CG-UCI to be transmitted in.

In some embodiments, a value for $R_{PUSCH}$ and/or $M_{PUSCH}$ is indicated to the UE in downlink control information (DCI) from a network. In other embodiments, the value for $R_{PUSCH}$ and/or $M_{PUSCH}$ is transmitted to the UE using Radio Resource Control (RRC) signaling by the network or more may fixed in specifications known to the UE.

In example embodiments, one or more bits of the multiplexed HARQ-ACK/CSI UCI are dropped so that there are a sufficient number of bits available in the actual PUSCH repetition for the CG-UCI to be multiplexed into. In example embodiments, one or more bits of the multiplexed HARQ-ACK/CSI UCI are dropped such that the percentage of bits occupied by the HARQ-ACK/CSI UCI is less than or equal to $M_{PUSCH}$. In example embodiments, one or more bits of the multiplexed HARQ-ACK/CSI UCI are dropped such that a number of remaining bits in the actual PUSCH repetition is greater than or equal to $R_{PUSCH}$. In example embodiments, all of the bits for the HARQ-ACK/CSI UCI bits are dropped.

In example embodiments, the CSI Type 2 is dropped. In such embodiments, if there are still an insufficient number of bits available in the actual PUSCH repetition for the CG-UCI to be multiplexed into then CSI Type 1 is also dropped.

Explicit Indications for Multiplexing CG-UCI

In example embodiments, one or more rules are defined on how one or more CG-UCIs are multiplexed into one or more CG-PUSCH repetitions. In such embodiments, the UE may receive an explicit indication from the network informing the UE which CG-UCIs should be multiplexed into which CG-PUSCH repetitions. The explicit indication may be received from the network in DCI or via RRC signaling.

In example embodiments, the PUSCH repetition that the CG-UCI is multiplexed into is indicated in the DCI activating the CG-PUSCH. In such embodiments, the CG-PUSCH is a Type 2 CG-PUSCH as explained above.

Configured Grant UCI for Unlicensed URLLC

Figure 21:
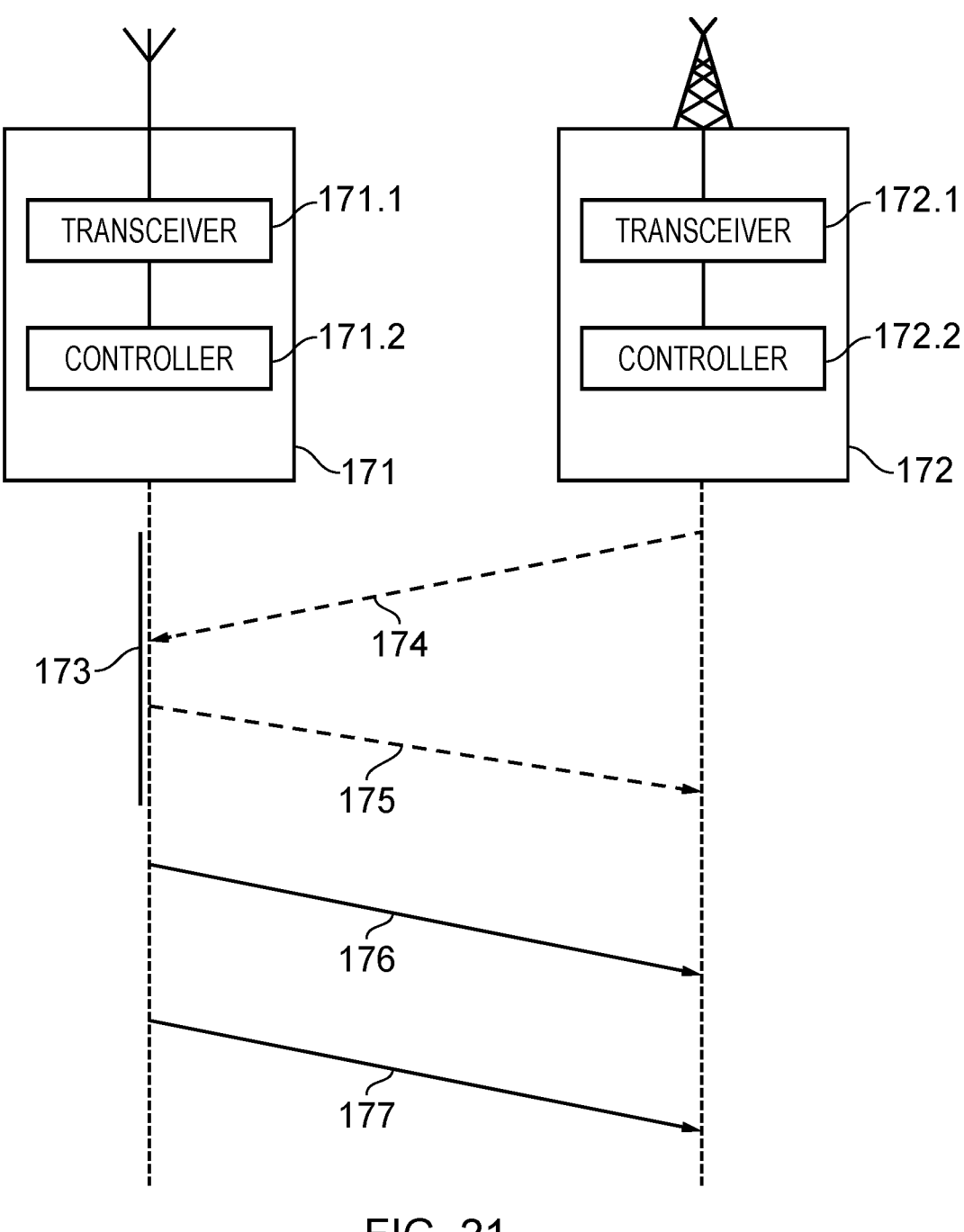
FIG. 21 shows a part schematic, part message flow diagram representation of a wireless communications network comprising a communications device and an infrastructure equipment in accordance with embodiments of the present technique.

FIG. 21 shows a part schematic, part message flow diagram representation of a wireless communications network comprising a communications device 171 and an infrastructure equipment 172 in accordance with at least some embodiments of the present technique. The communications device 171 is configured to transmit data to or receive data from the wireless communications network, for example, to and from the infrastructure equipment 172, via a wireless access interface provided by the wireless communications network. Specifically, the communications device 172 may be configured to support Ultra Reliable Low Latency Communications (URLLC) data to the wireless communications network (e.g. to the infrastructure equipment 172) via the wireless access interface. The communications device 171 and the infrastructure equipment 172 each comprise a transceiver (or transceiver circuitry) 171.1, 172.1, and a controller (or controller circuitry) 171.2, 172.2. Each of the controllers 171.2, 172.2 may be, for example, a microprocessor, a CPU, or a dedicated chipset, etc.

As shown in the example of FIG. 21, the transceiver circuitry 171.1 and the controller circuitry 171.2 of the communications device 171 are configured in combination, to operate 173 in accordance with a configured grant (CG) mode of operation, the CG mode of operation comprising the communications device 171 being configured to determine 174 (e.g. via an indication or command received from the wireless communications network, such as from infrastructure equipment 172) a sequence of instances of uplink communications resources of the wireless access interface, and to transmit 175 uplink data to the wireless communications network (for example, to the infrastructure equipment 172) in at least one instance of the sequence of instances of uplink communications resources of the wireless access interface, to transmit 176, to the wireless communications network (for example, from the infrastructure equipment 172), uplink control information relating to the CG mode of operation (CG-UCI) the CG-UCI comprising one or more indicators which indicate information to support URLLC transmissions, and to transmit 177 the uplink data in accordance with the information to support URLLC transmissions indicated by the one or more indicators of the transmitted CG-UCI.

Flow Chart Representation

Figure 22:
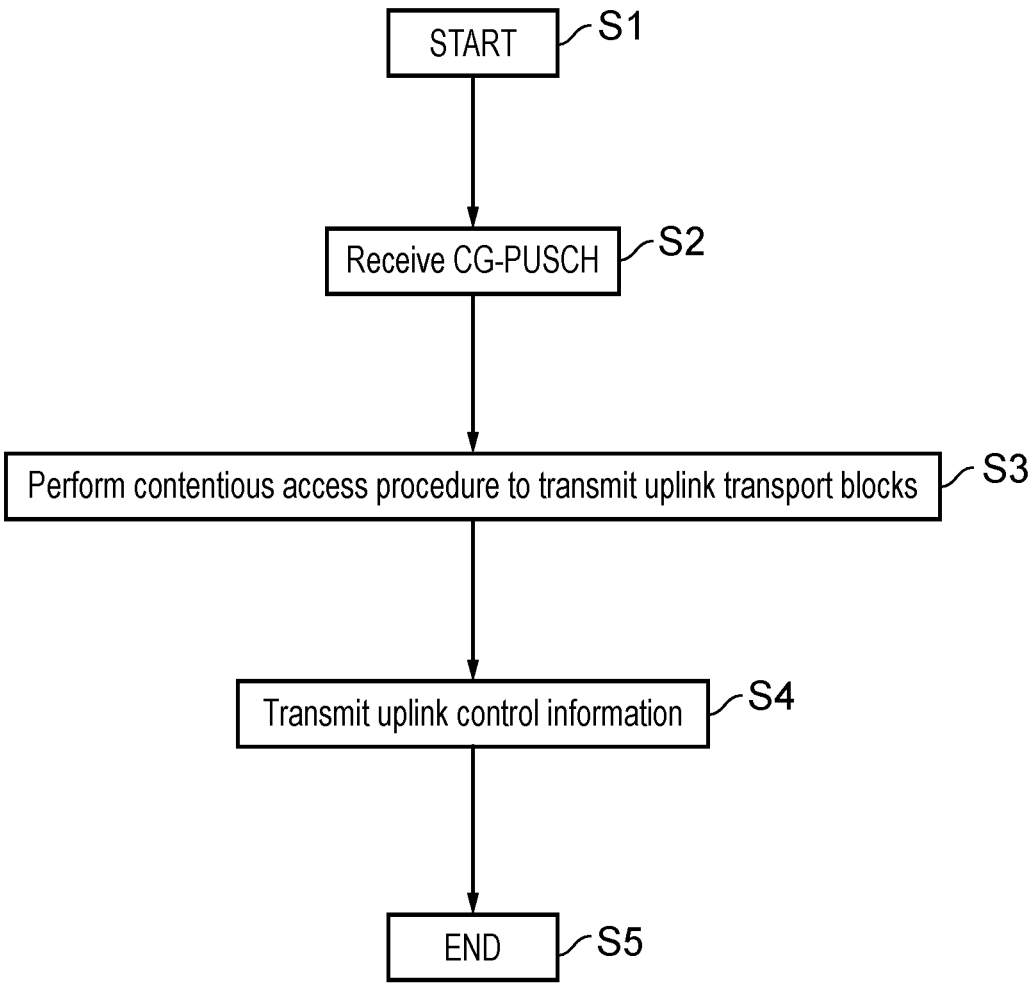
FIG. 22 shows a flow diagram illustrating a process of communications in a communications system in accordance with embodiments of the present technique.

FIG. 22 shows a flow diagram illustrating an example process of communications in a communications system in accordance with embodiments of the present technique. The process shown by FIG. 22 is a method of operating a communications device (which may be configured to transmit data to or receive data from an infrastructure equipment) in a wireless communications network.

The method begins in step S1. In step S2, the communications device receives from the wireless access network a configured grant, CG, of physical uplink shared channel, PUSCH, resources of a wireless access interface which includes physical resources of an unlicensed frequency bandwidth, the configured CG-PUSCH resources providing a plurality of flexible transmission occasions for the communications device to transmit uplink transport blocks as a plurality of K repetitions of each of the uplink transport blocks, each repetition being one of a plurality of redundancy versions, the flexible transmission opportunities of the CG-PUSCH being accessible for transmission according to a contentious access procedure of the wireless access interface in the unlicensed frequency bandwidth. In one example, each repetition is one of a plurality of redundancy versions according to a redundancy version pattern for transmitting the uplink transport block.

In step S3, the communications device performs the contentious access procedure to transmit the uplink transport blocks as one or more of the plurality of the K repetitions in the flexible transmission occasions according to the contentious access procedure. In one example, the contentious access procedure is performed to transmit the uplink transport blocks as one or more of the plurality of K repetitions.

In step S4, the communications device transmits for each uplink transport block, transmitted as the one or more of the K repetitions, uplink control information, UCI, relating to the configured grant, CG, the CG-UCI providing an indication relating to the transmission of the uplink transport blocks as the one or more K plurality of repetitions, wherein the transmitting the CG-UCI comprises multiplexing the CG-UCI into a subset of the transmitted one or more K plurality of repetitions. In one example, the indication relating to the transmission of the uplink transport blocks as the one or more K plurality of repetitions is an indication of at least the redundancy version for each of the transmitted one or more K plurality of repetitions. In another example, the indication relating to the transmission of the uplink transport blocks as the one or more K plurality of repetitions is an indication of at least a repetition index for each of the transmitted one or more K plurality of repetitions The method ends in step S5.

Those skilled in the art would appreciate that the method shown by FIG. 22 may be adapted in accordance with embodiments of the present technique. For example, other intermediate steps may be included in the method, or the steps may be performed in any logical order.

Though embodiments of the present technique have been described largely by way of the example communications system shown in FIG. 21, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device to communicate via a wireless communications network, the method comprising receiving from the wireless access network a configured grant, CG, of physical uplink shared channel, PUSCH, resources of a wireless access interface which includes physical resources of an unlicensed frequency bandwidth, the configured CG-PUSCH resources providing a plurality of flexible transmission occasions for the communications device to transmit uplink transport blocks as a plurality of K repetitions of each of the uplink transport blocks, each repetition being one of a plurality of redundancy versions, the flexible transmission opportunities of the CG-PUSCH being accessible for transmission according to a contentious access procedure of the wireless access interface in the unlicensed frequency bandwidth, performing the contentious access procedure to transmit the uplink transport blocks as one or more of the plurality of the K repetitions in the flexible transmission occasions according to the contentious access procedure, and transmitting for each uplink transport block, transmitted as the one or more of the K repetitions, uplink control information, UCI, relating to the configured grant, CG, the CG-UCI providing an indication for the transmitted one or more K plurality of repetitions, wherein the transmitting the CG-UCI comprises multiplexing the CG-UCI into a subset of the transmitted one or more K plurality of repetitions.

Paragraph 2. A method according to paragraph 1, wherein the multiplexing the CG-UCI comprises multiplexing the CG-UCI into a first of the transmitted one or more K plurality of repetitions.

Paragraph 3. A method according to paragraph 1 or 2, wherein the multiplexing the CG-UCI comprises multiplexing the CG-UCI into at least one redundancy version from which the uplink transport block can be decoded without decoding one or more of the other redundancy versions.

Paragraph 4. A method according to paragraph 3, wherein the at least one redundancy version from which the uplink transport block can be decoded without decoding one or more of the other redundancy versions is a redundancy version zero, RV0.

Paragraph 5. A method according to paragraph 1, wherein the wireless access interface comprises physical communications resources, the flexible transmission occasions of the PUSCH each comprising a plurality of the physical communications resources, wherein the performing the contentious access procedure to transmit the uplink transport blocks as one or more of the plurality of the K repetitions, comprises performing the contentious access procedure to be granted access to transmit the uplink transport blocks as one or more of the plurality of the K repetitions using one or more of the plurality of the physical communications resources, and the multiplexing the CG-UCI comprises multiplexing the CG-UCI into one or more of the K plurality of repetitions having at least N of the plurality of the physical communications resources granted for transmitting the uplink transport block.

Paragraph 6. A method according to paragraph 5, wherein the multiplexing the CG-UCI comprises multiplexing the CG-UCI into one or more of the K plurality of repetitions having a largest number of the plurality of the physical communications resources granted for transmitting the uplink transport block.

Paragraph 7. A method according to paragraph 6, wherein if more than one of the K plurality of repetitions has the largest number of the plurality of the physical communications resources, the multiplexing the CG-UCI comprises multiplexing the CG-UCI into an earliest of the K plurality of repetitions having the largest number of the plurality of the physical communications resources granted for transmitting the uplink transport block.

Paragraph 8. A method according to paragraph 5, 6 or 7, wherein the physical communications resources of the wireless access interface comprise a plurality of Orthogonal Frequency Division Multiplexed, OFDM, symbols in each of a plurality of time slots, the flexible transmission occasions of the PUSCH each comprising a plurality of L OFDM symbols.

Paragraph 9. A method according to paragraph 8, wherein the plurality of flexible transmission occasions of each CG-PUSCH comprises a plurality of continuous L times K OFDM symbols of the PUSCH, and one or more of the plurality of continuous L times K OFDM symbols of the PUSCH cannot be used for transmitting creating a time gap interrupting a CG-PUSCH transmission between one or more of the K repetitions of the uplink transport block, and the transmitting the CG-UCI includes multiplexing the CG-UCI into an earliest of one or more of the K plurality of repetitions after the time gap forming a remainder of the continuous L times K OFDM symbols.

Paragraph 10. A method according to paragraph 9, wherein the CG-UCI transmitted in the earliest of the one or more of the K plurality of repetitions after the time gap that the remainder identifies that the remainder of the continuous L times K OFDM symbols are a continuation of one or more K plurality of repetitions carrying a same uplink transport block.

Paragraph 11. A method according to paragraph 9 or 10, wherein the time gap interrupting the CG-PUSCH transmission is caused by one of a downlink transmission via the wireless access interface or an unsuccessful access of the wireless access interface according to the contentious access procedure.

Paragraph 12. A method according to any preceding paragraph, wherein the CG-UCI is configured as one of a plurality of different types of CG-UCI providing different combination of information relating to the one or more of the K repetitions of the configured grant, and the multiplexing the CG-UCI into the subset of the transmitted one or more K plurality of repetitions comprises multiplexing each different type of the CG-UCI into different ones of the one or more K plurality of repetitions.

Paragraph 13. A method according to paragraph 12, wherein a first of the different types of the CG-UCI includes the redundancy version, and at least one of a hybrid automatic repeat request, HARQ, process number, HPN, a New Data Indicator, NDI, and Channel Occupancy Time, COT, sharing information, and a second of the different types of the CG-UCI includes the redundancy version, and the multiplexing the CG-UCI into the subset of the transmitted one or more K plurality of repetitions comprises multiplexing the CG-UCI of the first type into the first of the transmitted one or more K plurality of repetitions and multiplexing the CG-UCI of the second type into one or more of the remaining K plurality of repetitions.

Paragraph 14. A method according to any of paragraphs 1 to 13, wherein the multiplexing the CG-UCI comprises multiplexing other uplink control information into one or more of the transmitted K plurality of repetitions, and multiplexing the CG-UCI into at least one of remaining ones of the transmitted one or more K plurality of repetitions in which the other uplink control information is not multiplexed for transmission.

Paragraph 15. A method according to any of paragraphs 1 to 13, wherein the multiplexing the CG-UCI comprises multiplexing other uplink control information into one or more of the transmitted K plurality of repetitions, and multiplexing the CG-UCI into the one or more of the transmitted K plurality of repetitions with the other uplink control information if predetermined conditions are satisfied.

Paragraph 16. A method according to paragraph 15, wherein the predetermined conditions includes whether a proportion of available resources of the repetition used to carry the other control information is less than a predetermined threshold.

Paragraph 17. A method according to paragraph 16, wherein if the proportion exceeds the predetermined threshold multiplexing the CG-UCI into at least one of remaining ones of the transmitted one or more K plurality of repetitions in which the other uplink control information is not multiplexed for transmission.

Paragraph 18. A method according to paragraph 15, wherein the predetermined conditions include whether available resources of the repetition remaining after multiplexing the other uplink control information into the repetition exceed a predetermined threshold.

Paragraph 19. A method according to paragraph 18, wherein if the available resources of the repetition remaining after multiplexing the other uplink control information into the repetition are less than a predetermined threshold, multiplexing the CG-UCI into at least one of remaining ones of the transmitted one or more K plurality of repetitions in which the other uplink control information is not multiplexed for transmission.

Paragraph 20. A method according to any of paragraphs 1 to 13, wherein the multiplexing the CG-UCI comprises multiplexing other uplink control information into one or more of the transmitted K plurality of repetitions, and multiplexing the CG-UCI into the one or more of the transmitted K plurality of repetitions with the other uplink control information by replacing some or all of the other control information.

Paragraph 21. A method according to any of paragraphs 14 to 20, wherein the other uplink control information include at least one of hybrid automatic repeat request, HARQ, acknowledgements or negative acknowledgements, ACK, for downlink transmissions and channel state information.

Paragraph 22. A method according to any of paragraphs 1 to 21, comprising receiving an indication of the subset of the transmitted one or more K plurality of repetitions into which the CG-UCI should be multiplexed.

Paragraph 23. A method according to paragraph 22, wherein the indication of the subset of the transmitted one or more K plurality of repetitions include one of radio resource control signalling, or downlink control information received to provide the CG-PUSCH.

Paragraph 24. A method according to Paragraph 1, wherein the one or more indicators of the CG-UCI comprise a physical layer priority indicator which defines a physical layer priority level of the URLLC data.

Paragraph 25. A method of operating an infrastructure equipment to communicate via a wireless communications network, the method comprising transmitting, by transceiver circuitry in the infrastructure equipment to a communications device in the wireless communications network, a configured grant, CG, of physical uplink shared channel, PUSCH, resources of a wireless access interface which includes physical resources of an unlicensed frequency bandwidth, the configured CG-PUSCH resources providing a plurality of flexible transmission occasions for the communications device to transmit uplink transport blocks as a plurality of K repetitions of each of the uplink transport blocks, each repetition being one of a plurality of redundancy versions, the flexible transmission opportunities of the CG-PUSCH being accessible for transmission according to a contentious access procedure of the wireless access interface in the unlicensed frequency bandwidth, receiving the uplink transport blocks as one or more of the plurality of the K repetitions in the flexible transmission occasions according to the contentious access procedure, and receiving, by the transceiver circuitry in the infrastructure equipment, for each uplink transport block, received as the one or more of the K repetitions, uplink control information, UCI, relating to the configured grant, CG, the CG-UCI providing an indication relating to the reception of the one or more K plurality of repetitions, wherein the CG-UCI is multiplexed by the communications device into a subset of the received one or more K plurality of repetitions.

Paragraph 26. A method according to any of paragraph 25, comprising transmitting an indication of the subset of the transmitted one or more K plurality of repetitions into which the CG-UCI should be multiplexed.

Paragraph 27. A method according to paragraph 26, wherein the indication of the subset of the transmitted one or more K plurality of repetitions include one of radio resource control signalling, or downlink control information transmitted to provide the CG-PUSCH.

Paragraph 28. A method according to Paragraph 25, wherein the one or more indicators of the CG-UCI comprise a physical layer priority indicator which defines a physical layer priority level of the URLLC data.

Paragraph 29. A communications device configured to communicate via a wireless communications network, the communications device comprising:

transceiver circuitry configured to transmit and receive signals;

control circuitry configured to control the transceiver circuitry to receive, from the wireless access network a configured grant, CG, of physical uplink shared channel, PUSCH, resources of a wireless access interface which includes physical resources of an unlicensed frequency bandwidth, the configured CG-PUSCH resources providing a plurality of flexible transmission occasions for the communications device to transmit uplink transport blocks as a plurality of K repetitions of each of the uplink transport blocks, each repetition being one of a plurality of redundancy versions, the flexible transmission opportunities of the CG-PUSCH being accessible for transmission according to a contentious access procedure of the wireless access interface in the unlicensed frequency bandwidth, perform the contentious access procedure to transmit the uplink transport blocks as one or more of the plurality of the K repetitions in the flexible transmission occasions according to the contentious access procedure, and transmit for each uplink transport block, transmitted as the one or more of the K repetitions, uplink control information, UCI, relating to the configured grant, CG, the CG-UCI providing an indication for the transmitted one or more K plurality of repetitions, wherein the transmitting the CG-UCI comprises multiplexing the CG-UCI into a subset of the transmitted one or more K plurality of repetitions.

Paragraph 30.Circuitry for a communications device configured to communicate via a wireless communications network, the circuitry comprising transceiver circuitry configured to transmit and receive signals;

control circuitry configured to control the transceiver circuitry to receive, from the wireless access network a configured grant, CG, of physical uplink shared channel, PUSCH, resources of a wireless access interface which includes physical resources of an unlicensed frequency bandwidth, the configured CG-PUSCH resources providing a plurality of flexible transmission occasions for the communications device to transmit uplink transport blocks as a plurality of K repetitions of each of the uplink transport blocks, each repetition being one of a plurality of redundancy versions, the flexible transmission opportunities of the CG-PUSCH being accessible for transmission according to a contentious access procedure of the wireless access interface in the unlicensed frequency bandwidth, perform the contentious access procedure to transmit the uplink transport blocks as one or more of the plurality of the K repetitions in the flexible transmission occasions according to the contentious access procedure, and transmit for each uplink transport block, transmitted as the one or more of the K repetitions, uplink control information, UCI, relating to the configured grant, CG, the CG-UCI providing an indication for the transmitted one or more K plurality of repetitions, wherein the transmitting the CG-UCI comprises multiplexing the CG-UCI into a subset of the transmitted one or more K plurality of repetitions.

Paragraph 31.An infrastructure equipment configured to communicate via a wireless communications network, the infrastructure equipment comprising transceiver circuitry configured to transmit and receive signals;

control circuitry configured to control the transceiver circuitry to transmit, to a communications device in the wireless communications network, a configured grant, CG, of physical uplink shared channel, PUSCH, resources of a wireless access interface which includes physical resources of an unlicensed frequency bandwidth, the configured CG-PUSCH resources providing a plurality of flexible transmission occasions for the communications device to transmit uplink transport blocks as a plurality of K repetitions of each of the uplink transport blocks, each repetition being one of a plurality of redundancy versions, the flexible transmission opportunities of the CG-PUSCH being accessible for transmission according to a contentious access procedure of the wireless access interface in the unlicensed frequency bandwidth, receive the uplink transport blocks as one or more of the plurality of the K repetitions in the flexible transmission occasions according to the contentious access procedure, and receive, for each uplink transport block, received as the one or more of the K repetitions, uplink control information, UCI, relating to the configured grant, CG, the CG-UCI providing an indication relating to the reception of the one or more K plurality of repetitions, wherein the CG-UCI is multiplexed by the communications device into a subset of the received one or more K plurality of repetitions.

Paragraph 32.Circuitry for an infrastructure equipment configured to communicate via a wireless communications network, the circuitry comprising transceiver circuitry configured to transmit and receive signals;

control circuitry configured to control the transceiver circuitry to transmit, to a communications device in the wireless communications network, a configured grant, CG, of physical uplink shared channel, PUSCH, resources of a wireless access interface which includes physical resources of an unlicensed frequency bandwidth, the configured CG-PUSCH resources providing a plurality of flexible transmission occasions for the communications device to transmit uplink transport blocks as a plurality of K repetitions of each of the uplink transport blocks, each repetition being one of a plurality of redundancy versions, the flexible transmission opportunities of the CG-PUSCH being accessible for transmission according to a contentious access procedure of the wireless access interface in the unlicensed frequency bandwidth, receive the uplink transport blocks as one or more of the plurality of the K repetitions in the flexible transmission occasions according to the contentious access procedure, and receive, for each uplink transport block, received as the one or more of the K repetitions, uplink control information, UCI, relating to the configured grant, CG, the CG-UCI providing an indication relating to the reception of the one or more K plurality of repetitions, wherein the CG-UCI is multiplexed by the communications device into a subset of the received one or more K plurality of repetitions Paragraph 33.A communications device including transceiver circuitry and control circuitry including a processor for executing computer executable code, and when the computer executable code is executed the processor performs the method according to paragraph 1.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] TR 38.913, "Study on Scenarios and Requirements for Next Generation Access Technologies (Release 14)", third Generation Partnership Project, v14.3.0.
[3] RP-190726, "Physical layer enhancements for NR ultra-reliable and low latency communication (URLLC)", Huawei, HiSilicon, RAN #83.
[4] RP-201310, "Revised WID: Enhanced Industrial Internet of Things (IoT) and ultra-reliable and low latency communication (URLLC) support for NR," Nokia, Nokia Shanghai Bell, RAN #88e.
[5] RP-191575, "NR-based Access to Unlicensed Spectrum," Qualcomm, RAN #84.
[6] European patent application number EP20187799.0.
[7] TS 38.321, "NR: Medium Access Control (MAC) protocol specification (Release 16)," v16.1.0.
[8] TS 38.212, "NR: Multiplexing and channel coding (Release 16)," v16.1.0.

What is claimed is:

1. A method of operating a communications device to communicate via a wireless communications network, the method comprising receiving from the wireless communications network a configured grant, CG, of physical uplink shared channel, PUSCH, resources of a wireless access interface which includes physical resources of an unlicensed frequency bandwidth, the configured CG-PUSCH resources providing a plurality of flexible transmission occasions for the communications device to transmit uplink transport blocks as a plurality of K repetitions of each of the uplink transport blocks, each repetition being one of a plurality of redundancy versions, the flexible transmission occasions of the CG-PUSCH being accessible for transmission according to a contentious access procedure of the wireless access interface in the unlicensed frequency bandwidth, performing the contentious access procedure to transmit the uplink transport blocks as one or more of the plurality of the K repetitions in the flexible transmission occasions according to the contentious access procedure, and transmitting for each uplink transport block, transmitted as the one or more of the K repetitions, uplink control information, UCI, relating to the configured grant, CG, the CG-UCI providing an indication for the transmitted one or more K plurality of repetitions, wherein the transmitting the CG-UCI comprises multiplexing the CG-UCI into a subset of the transmitted one or more K plurality of repetitions, wherein the CG-UCI is configured as one of a plurality of different types of CG-UCI, the plurality of different types comprising a first type and a second type, the first type includes a redundancy version, a hybrid automatic repeat request (HARQ) process number (HPN), a New Data Indicator (NDI), and Channel Occupancy Time (COT) sharing information, the second type includes the redundancy version, the multiplexing the CG-UCI into the subset of the transmitted one or more K plurality of repetitions comprises multiplexing each different type of the CG-UCI into different ones of the one or more K plurality of repetitions, and the multiplexing the each different type of the CG-UCI comprises multiplexing the CG-UCI of the first type into the first of the transmitted one or more K plurality of repetitions and multiplexing the CG-UCI of the second type into one or more of the remaining K plurality of repetitions.

2. The method according to claim 1, wherein the multiplexing the CG-UCI comprises multiplexing the CG-UCI into a first of the transmitted one or more K plurality of repetitions.

3. The method according to claim 1, wherein the multiplexing the CG-UCI comprises multiplexing the CG-UCI into at least one redundancy version from which the uplink transport block can be decoded without decoding one or more of the other redundancy versions.

4. The method according to claim 3, wherein the at least one redundancy version from which the uplink transport block can be decoded without decoding one or more of the other redundancy versions is a redundancy version zero, RV0.

5. The method according to claim 1, wherein the wireless access interface comprises physical communications resources, the flexible transmission occasions of the PUSCH each comprising a plurality of the physical communications resources, wherein the performing the contentious access procedure to transmit the uplink transport blocks as one or more of the plurality of the K repetitions, comprises performing the contentious access procedure to be granted access to transmit the uplink transport blocks as one or more of the plurality of the K repetitions using one or more of the plurality of the physical communications resources, and the multiplexing the CG-UCI comprises multiplexing the CG-UCI into one or more of the K plurality of repetitions having at least N of the plurality of the physical communications resources granted for transmitting the uplink transport block.

6. The method according to claim 5, wherein the multiplexing the CG-UCI comprises multiplexing the CG-UCI into one or more of the K plurality of repetitions having a largest number of the plurality of the physical communications resources granted for transmitting the uplink transport block.

7. The method according to claim 6, wherein if more than one of the K plurality of repetitions has the largest number of the plurality of the physical communications resources, the multiplexing the CG-UCI comprises multiplexing the CG-UCI into an earliest of the K plurality of repetitions having the largest number of the plurality of the physical communications resources granted for transmitting the uplink transport block.

8. The method according to claim 5, wherein the physical communications resources of the wireless access interface comprise a plurality of Orthogonal Frequency Division Multiplexed, OFDM, symbols in each of a plurality of time slots, the flexible transmission occasions of the PUSCH each comprising a plurality of L OFDM symbols.

9. The method according to claim 8, wherein the plurality of flexible transmission occasions of each CG-PUSCH comprises a plurality of continuous L times K OFDM symbols of the PUSCH, and wherein one or more of the plurality of continuous L times K OFDM symbols of the PUSCH cannot be used for transmitting, thereby creating a time gap interrupting a CG-PUSCH transmission between one or more of the K repetitions of the uplink transport block, and the transmitting the CG-UCI includes multiplexing the CG-UCI into an earliest of one or more of the K plurality of repetitions after the time gap constituting a remainder of the continuous L times K OFDM symbols.

10. The method according to claim 9, wherein the CG-UCI transmitted in the earliest of the one or more of the K plurality of repetitions after the time gap includes an indication that the remainder of the continuous L times K OFDM symbols are a continuation of one or more of the K plurality of repetitions carrying a same uplink transport block.

11. The method according to claim 9, wherein the time gap interrupting the CG-PUSCH transmission is caused by one of a downlink transmission via the wireless access interface or an unsuccessful access of the wireless access interface according to the contentious access procedure.

12. The method according to claim 1, wherein the multiplexing the CG-UCI comprises multiplexing other uplink control information into one or more of the transmitted K plurality of repetitions, and multiplexing the CG-UCI into at least one of remaining ones of the transmitted one or more K plurality of repetitions in which the other uplink control information is not multiplexed for transmission.

13. The method according to claim 1, wherein the multiplexing the CG-UCI comprises multiplexing other uplink control information into one or more of the transmitted K plurality of repetitions, and multiplexing the CG-UCI into the one or more of the transmitted K plurality of repetitions with the other uplink control information if predetermined conditions are satisfied.

14. The method according to claim 1, wherein the multiplexing the CG-UCI comprises multiplexing other uplink control information into one or more of the transmitted K plurality of repetitions, and multiplexing the CG-UCI into the one or more of the transmitted K plurality of repetitions with the other uplink control information by replacing some or all of the other uplink control information.

15. The method according to claim 1, comprising receiving an indication of the subset of the transmitted one or more K plurality of repetitions into which the CG-UCI should be multiplexed.

16. The method according to claim 1, wherein the one or more indicators of the CG-UCI comprise a physical layer priority indicator which defines a physical layer priority level of Ultra Reliable Low Latency Communications (URLLC) data.

17. A communications device configured to communicate via a wireless communications network, the communications device comprising:

transceiver circuitry configured to transmit and receive signals;

control circuitry configured to control the transceiver circuitry to receive, from the wireless communications network a configured grant, CG, of physical uplink shared channel, PUSCH, resources of a wireless access interface which includes physical resources of an unlicensed frequency bandwidth, the configured CG-PUSCH resources providing a plurality of flexible transmission occasions for the communications device to transmit uplink transport blocks as a plurality of K repetitions of each of the uplink transport blocks, each repetition being one of a plurality of redundancy versions, the flexible transmission occasions of the CG-PUSCH being accessible for transmission according to a contentious access procedure of the wireless access interface in the unlicensed frequency bandwidth, perform the contentious access procedure to transmit the uplink transport blocks as one or more of the plurality of the K repetitions in the flexible transmission occasions according to the contentious access procedure, and transmit for each uplink transport block, transmitted as the one or more of the K repetitions, uplink control information, UCI, relating to the configured grant, CG, the CG-UCI providing an indication for the transmitted one or more K plurality of repetitions, wherein the transmitting the CG-UCI comprises multiplexing the CG-UCI into a subset of the transmitted one or more K plurality of repetitions, wherein the CG-UCI is configured as one of a plurality of different types of CG-UCI, the plurality of different types comprising a first type and a second type, the first type includes a redundancy version, a hybrid automatic repeat request (HARQ) process number (HPN), a New Data Indicator (NDI), and Channel Occupancy Time (COT) sharing information, the second type includes the redundancy version, the multiplexing the CG-UCI into the subset of the transmitted one or more K plurality of repetitions comprises multiplexing each different type of the CG-UCI into different ones of the one or more K plurality of repetitions, and the multiplexing the each different type of the CG-UCI comprises multiplexing the CG-UCI of the first type into the first of the transmitted one or more K plurality of repetitions and multiplexing the CG-UCI of the second type into one or more of the remaining K plurality of repetitions.

18. An infrastructure equipment configured to communicate via a wireless communications network, the infrastructure equipment comprising transceiver circuitry configured to transmit and receive signals;

control circuitry configured to control the transceiver circuitry to transmit, to a communications device in the wireless communications network, a configured grant, CG, of physical uplink shared channel, PUSCH, resources of a wireless access interface which includes physical resources of an unlicensed frequency bandwidth, the configured CG-PUSCH resources providing a plurality of flexible transmission occasions for the communications device to transmit uplink transport blocks as a plurality of K repetitions of each of the uplink transport blocks, each repetition being one of a plurality of redundancy versions, the flexible transmission occasions of the CG-PUSCH being accessible for transmission according to a contentious access procedure of the wireless access interface in the unlicensed frequency bandwidth, receive the uplink transport blocks as one or more of the plurality of the K repetitions in the flexible transmission occasions according to the contentious access procedure, and receive, for each uplink transport block, received as the one or more of the K repetitions, uplink control information, UCI, relating to the configured grant, CG, the CG-UCI providing an indication relating to the reception of the one or more K plurality of repetitions, wherein the CG-UCI is multiplexed by the communications device into a subset of the received one or more K plurality of repetitions, wherein the CG-UCI is configured as one of a plurality of different types of CG-UCI, the plurality of different types comprising a first type and a second type, the first type includes a redundancy version, a hybrid automatic repeat request (HARQ) process number (HPN), a New Data Indicator (NDI), and Channel Occupancy Time (COT) sharing information, the second type includes the redundancy version, the multiplexing the CG-UCI into the subset of the transmitted one or more K plurality of repetitions comprises multiplexing each different type of the CG-UCI into different ones of the one or more K plurality of repetitions, and the multiplexing the each different type of the CG-UCI comprises multiplexing the CG-UCI of the first type into the first of the transmitted one or more K plurality of repetitions and multiplexing the CG-UCI of the second type into one or more of the remaining K plurality of repetitions.

* * * * *